United States Patent
Kikuchi et al.

(10) Patent No.: US 10,582,112 B2
(45) Date of Patent: Mar. 3, 2020

(54) FOCUS DETECTION DEVICE, FOCUS DETECTION METHOD, AND STORAGE MEDIUM STORING FOCUS DETECTION PROGRAM

(71) Applicant: Olympus Corporation, Hachioji-shi, Tokyo (JP)

(72) Inventors: Tetsuo Kikuchi, Hachioji (JP); Ryo Hatakeyama, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 16/157,023

(22) Filed: Oct. 10, 2018

(65) Prior Publication Data

US 2019/0109994 A1 Apr. 11, 2019

(30) Foreign Application Priority Data

Oct. 11, 2017 (JP) .................................. 2017-197849
Nov. 22, 2017 (JP) .................................. 2017-224790

(51) Int. Cl.

| H04N 5/232 | (2006.01) |
| H04N 5/353 | (2011.01) |
| H04N 9/04 | (2006.01) |
| H04N 5/345 | (2011.01) |
| G03B 13/36 | (2006.01) |

(52) U.S. Cl.
CPC ... *H04N 5/232122* (2018.08); *H04N 5/23209* (2013.01); *H04N 5/23287* (2013.01); *H04N 5/23293* (2013.01); *H04N 5/345* (2013.01); *H04N 5/3532* (2013.01); *H04N 9/04557* (2018.08); *G03B 13/36* (2013.01)

(58) Field of Classification Search
CPC ......... H04N 5/23212; H04N 5/232122; H04N 5/23293; H04N 5/345; H04N 5/3696; H04N 5/36961
See application file for complete search history.

(56) References Cited

U.S. PATENT DOCUMENTS

| 2011/0096189 A1* | 4/2011 | Taniguchi ................ G02B 7/34 348/222.1 |
| 2013/0107067 A1* | 5/2013 | Miyakoshi ......... H04N 5/23212 348/208.5 |

(Continued)

FOREIGN PATENT DOCUMENTS

JP 2015-161906 9/2015

*Primary Examiner* — Daniel M Pasiewicz
(74) *Attorney, Agent, or Firm* — John C. Pokotylo; Pokotylo Patent Services

(57) ABSTRACT

A focus detection device includes an imaging unit, an image processor, a focus detection circuit, and a control circuit. The imaging unit includes a pixel portion including light-receiving portions. The light-receiving portions are divided into first and second pupil division directions. The image processor performs processing to display an image based on a display pixel signal. The focus detection circuit performs processing for focus detection based on a focus detection pixel signal. The control circuit controls the imaging unit to generate the focus detection pixel signal regarding the first pupil division direction in a first operation, and controls the imaging unit to generate the display pixel signal and the focus detection pixel signal regarding the second pupil division direction in a second operation.

18 Claims, 19 Drawing Sheets

(56) References Cited

U.S. PATENT DOCUMENTS

2013/0293736 A1* 11/2013 Kuwazoe ............ H04N 5/3696
  348/222.1
2015/0002713 A1* 1/2015 Nomura ............ H04N 5/23212
  348/302

* cited by examiner

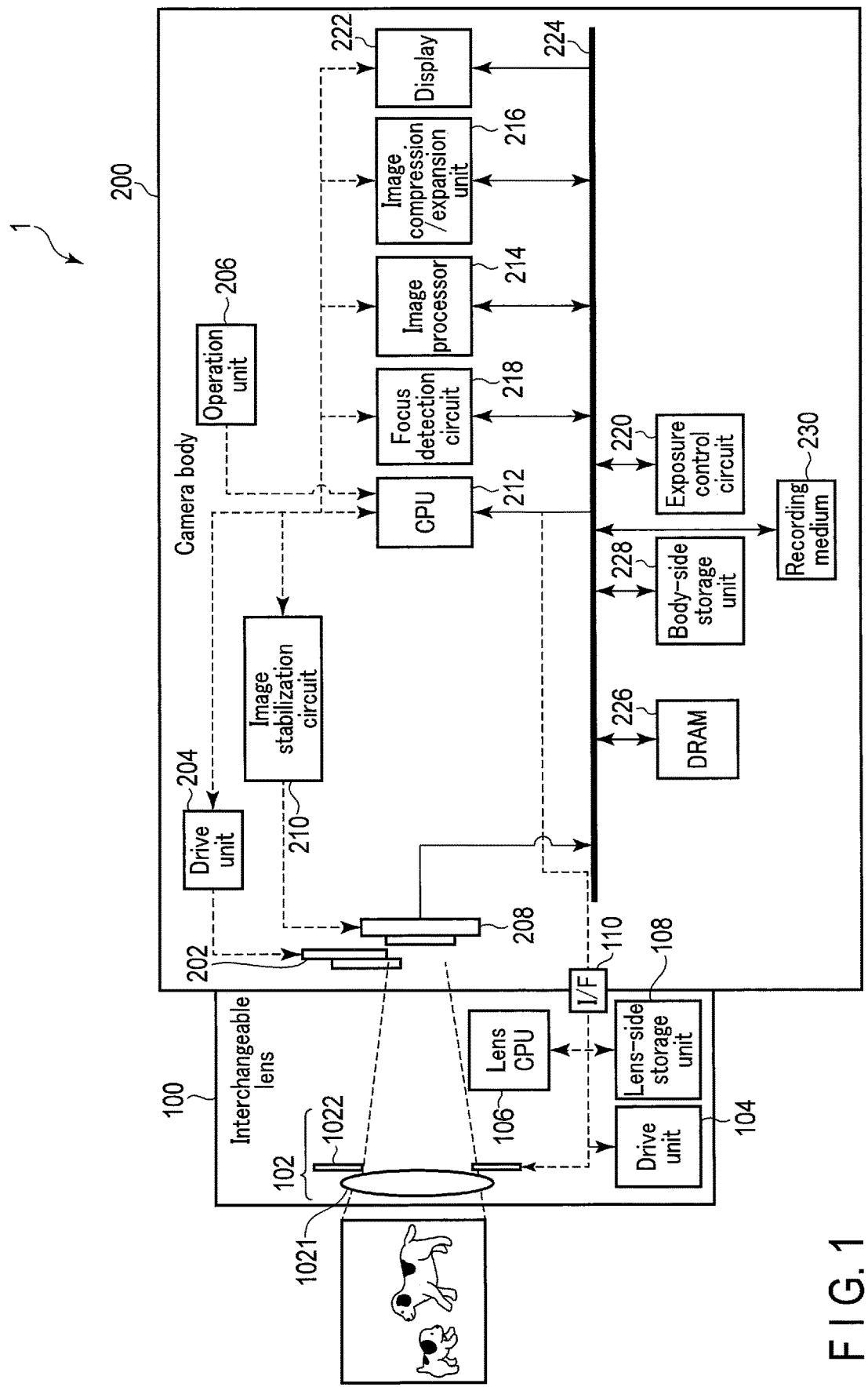
F I G. 1

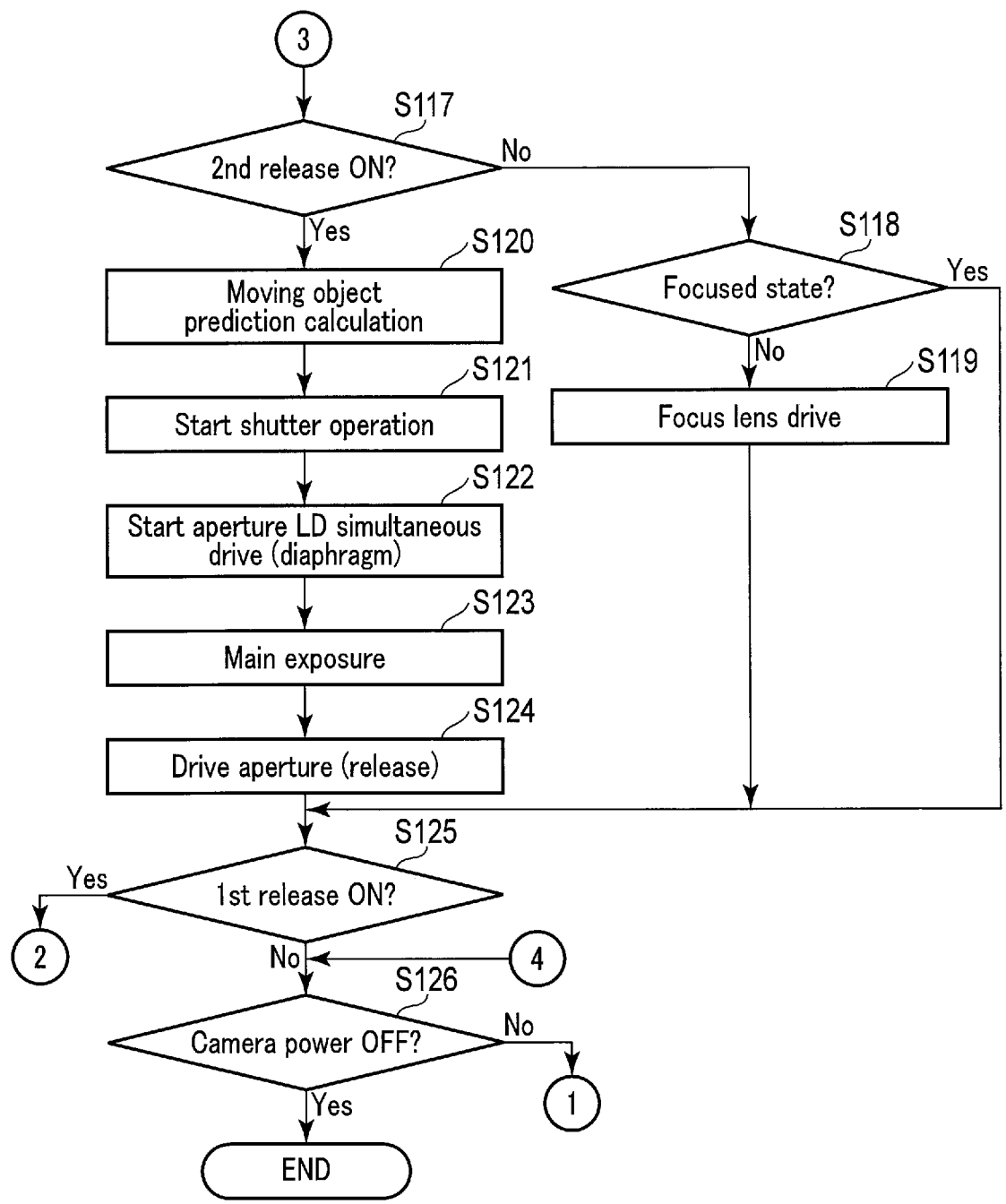
F I G. 5B

|     | m1  | m2  | m3  | m4  | m5  | m6  | m7  | m8  | m9  | m10 | m11 | m12 | m13 | m14 | m15 | m16 | m17 | m18 | m19 | m20 |
|-----|-----|-----|-----|-----|-----|-----|-----|-----|-----|-----|-----|-----|-----|-----|-----|-----|-----|-----|-----|-----|
| n1  | Rl  | Rr  | Grl | Grr | Rl  | Rr  | Grl | Grr | Rl  | Rr  | Grl | Grr | Rl  | Rr  | Grl | Grr | Rl  | Rr  | Grl | Grr |
| n2  | Gbl | Gbr | Bl  | Br  | Gbl | Gbr | Bl  | Br  | Gbl | Gbr | Bl  | Br  | Gbl | Gbr | Bl  | Br  | Gbl | Gbr | Bl  | Br  |
| n3  | Rl  | Rr  | Grl | Grr | Rl  | Rr  | Grl | Grr | Rl  | Rr  | Grl | Grr | Rl  | Rr  | Grl | Grr | Rl  | Rr  | Grl | Grr |
| n4  | Gbl | Gbr | Bl  | Br  | Gbl | Gbr | Bl  | Br  | Gbl | Gbr | Bl  | Br  | Gbl | Gbr | Bl  | Br  | Gbl | Gbr | Bl  | Br  |
| n5  | Rl  | Rr  | Grl | Grr | Rl  | Rr  | Grl | Grr | Rl  | Rr  | Grl | Grr | Rl  | Rr  | Grl | Grr | Rl  | Rr  | Grl | Grr |
| n6  | Gbl | Gbr | Bl  | Br  | Gbl | Gbr | Bl  | Br  | Gbl | Gbr | Bl  | Br  | Gbl | Gbr | Bl  | Br  | Gbl | Gbr | Bl  | Br  |
| n7  | Rl  | Rr  | Grl | Grr | Rl  | Rr  | Grl | Grr | Rl  | Rr  | Grl | Grr | Rl  | Rr  | Grl | Grr | Rl  | Rr  | Grl | Grr |
| n8  | Gbl | Gbr | Bl  | Br  | Gbl | Gbr | Bl  | Br  | Gbl | Gbr | Bl  | Br  | Gbl | Gbr | Bl  | Br  | Gbl | Gbr | Bl  | Br  |
| n9  | Rl  | Rr  | Grl | Grr | Rl  | Rr  | Grl | Grr | Rl  | Rr  | Grl | Grr | Rl  | Rr  | Grl | Grr | Rl  | Rr  | Grl | Grr |
| n10 | Gbl | Gbr | Bl  | Br  | Gbl | Gbr | Bl  | Br  | Gbl | Gbr | Bl  | Br  | Gbl | Gbr | Bl  | Br  | Gbl | Gbr | Bl  | Br  |
| n11 | Rl  | Rr  | Grl | Grr | Rl  | Rr  | Grl | Grr | Rl  | Rr  | Grl | Grr | Rl  | Rr  | Grl | Grr | Rl  | Rr  | Grl | Grr |
| n12 | Gbl | Gbr | Bl  | Br  | Gbl | Gbr | Bl  | Br  | Gbl | Gbr | Bl  | Br  | Gbl | Gbr | Bl  | Br  | Gbl | Gbr | Bl  | Br  |
| n13 | Rl  | Rr  | Grl | Grr | Rl  | Rr  | Grl | Grr | Rl  | Rr  | Grl | Grr | Rl  | Rr  | Grl | Grr | Rl  | Rr  | Grl | Grr |
| n14 | Gbl | Gbr | Bl  | Br  | Gbl | Gbr | Bl  | Br  | Gbl | Gbr | Bl  | Br  | Gbl | Gbr | Bl  | Br  | Gbl | Gbr | Bl  | Br  |
| n15 | Rl  | Rr  | Grl | Grr | Rl  | Rr  | Grl | Grr | Rl  | Rr  | Grl | Grr | Rl  | Rr  | Grl | Grr | Rl  | Rr  | Grl | Grr |
| n16 | Gbl | Gbr | Bl  | Br  | Gbl | Gbr | Bl  | Br  | Gbl | Gbr | Bl  | Br  | Gbl | Gbr | Bl  | Br  | Gbl | Gbr | Bl  | Br  |
| n17 | Rl  | Rr  | Grl | Grr | Rl  | Rr  | Grl | Grr | Rl  | Rr  | Grl | Grr | Rl  | Rr  | Grl | Grr | Rl  | Rr  | Grl | Grr |
| n18 | Gbl | Gbr | Bl  | Br  | Gbl | Gbr | Bl  | Br  | Gbl | Gbr | Bl  | Br  | Gbl | Gbr | Bl  | Br  | Gbl | Gbr | Bl  | Br  |
| n19 | Rl  | Rr  | Grl | Grr | Rl  | Rr  | Grl | Grr | Rl  | Rr  | Grl | Grr | Rl  | Rr  | Grl | Grr | Rl  | Rr  | Grl | Grr |
| n20 | Gbl | Gbr | Bl  | Br  | Gbl | Gbr | Bl  | Br  | Gbl | Gbr | Bl  | Br  | Gbl | Gbr | Bl  | Br  | Gbl | Gbr | Bl  | Br  |
| n21 | Rl  | Rr  | Grl | Grr | Rl  | Rr  | Grl | Grr | Rl  | Rr  | Grl | Grr | Rl  | Rr  | Grl | Grr | Rl  | Rr  | Grl | Grr |
| n22 | Gbl | Gbr | Bl  | Br  | Gbl | Gbr | Bl  | Br  | Gbl | Gbr | Bl  | Br  | Gbl | Gbr | Bl  | Br  | Gbl | Gbr | Bl  | Br  |
| n23 | Rl  | Rr  | Grl | Grr | Rl  | Rr  | Grl | Grr | Rl  | Rr  | Grl | Grr | Rl  | Rr  | Grl | Grr | Rl  | Rr  | Grl | Grr |
| n24 | Gbl | Gbr | Bl  | Br  | Gbl | Gbr | Bl  | Br  | Gbl | Gbr | Bl  | Br  | Gbl | Gbr | Bl  | Br  | Gbl | Gbr | Bl  | Br  |
| n25 | Rl  | Rr  | Grl | Grr | Rl  | Rr  | Grl | Grr | Rl  | Rr  | Grl | Grr | Rl  | Rr  | Grl | Grr | Rl  | Rr  | Grl | Grr |
| n26 | Gbl | Gbr | Bl  | Br  | Gbl | Gbr | Bl  | Br  | Gbl | Gbr | Bl  | Br  | Gbl | Gbr | Bl  | Br  | Gbl | Gbr | Bl  | Br  |
| n27 | Rl  | Rr  | Grl | Grr | Rl  | Rr  | Grl | Grr | Rl  | Rr  | Grl | Grr | Rl  | Rr  | Grl | Grr | Rl  | Rr  | Grl | Grr |
| n28 | Gbl | Gbr | Bl  | Br  | Gbl | Gbr | Bl  | Br  | Gbl | Gbr | Bl  | Br  | Gbl | Gbr | Bl  | Br  | Gbl | Gbr | Bl  | Br  |
| n29 | Rl  | Rr  | Grl | Grr | Rl  | Rr  | Grl | Grr | Rl  | Rr  | Grl | Grr | Rl  | Rr  | Grl | Grr | Rl  | Rr  | Grl | Grr |
| n30 | Gbl | Gbr | Bl  | Br  | Gbl | Gbr | Bl  | Br  | Gbl | Gbr | Bl  | Br  | Gbl | Gbr | Bl  | Br  | Gbl | Gbr | Bl  | Br  |
| n31 | Rl  | Rr  | Grl | Grr | Rl  | Rr  | Grl | Grr | Rl  | Rr  | Grl | Grr | Rl  | Rr  | Grl | Grr | Rl  | Rr  | Grl | Grr |
| n32 | Gbl | Gbr | Bl  | Br  | Gbl | Gbr | Bl  | Br  | Gbl | Gbr | Bl  | Br  | Gbl | Gbr | Bl  | Br  | Gbl | Gbr | Bl  | Br  |
| n33 | Rl  | Rr  | Grl | Grr | Rl  | Rr  | Grl | Grr | Rl  | Rr  | Grl | Grr | Rl  | Rr  | Grl | Grr | Rl  | Rr  | Grl | Grr |
| n34 | Gbl | Gbr | Bl  | Br  | Gbl | Gbr | Bl  | Br  | Gbl | Gbr | Bl  | Br  | Gbl | Gbr | Bl  | Br  | Gbl | Gbr | Bl  | Br  |
| n35 | Rl  | Rr  | Grl | Grr | Rl  | Rr  | Grl | Grr | Rl  | Rr  | Grl | Grr | Rl  | Rr  | Grl | Grr | Rl  | Rr  | Grl | Grr |
| n36 | Gbl | Gbr | Bl  | Br  | Gbl | Gbr | Bl  | Br  | Gbl | Gbr | Bl  | Br  | Gbl | Gbr | Bl  | Br  | Gbl | Gbr | Bl  | Br  |

FIG. 7

|    | m1  | m2  | m3  | m4  | m5  | m6  | m7  | m8  | m9  | m10 |
|----|-----|-----|-----|-----|-----|-----|-----|-----|-----|-----|
| n1 | Grl | Grr | Grl | Grr | Grl | Grr | Grl | Grr | Grl | Grr |
| n2 | Gbl | Gbr | Gbl | Gbr | Gbl | Gbr | Gbl | Gbr | Gbl | Gbr |
| n3 | Grl | Grr | Grl | Grr | Grl | Grr | Grl | Grr | Grl | Grr |
| n4 | Gbl | Gbr | Gbl | Gbr | Gbl | Gbr | Gbl | Gbr | Gbl | Gbr |
| n5 | Grl | Grr | Grl | Grr | Grl | Grr | Grl | Grr | Grl | Grr |
| n6 | Gbl | Gbr | Gbl | Gbr | Gbl | Gbr | Gbl | Gbr | Gbl | Gbr |

FIG. 8

|     | m1 | m2 | m3 | m4 | m5 | m6 | m7 | m8 | m9 | m10 | m11 | m12 | m13 | m14 | m15 | m16 | m17 | m18 | m19 | m20 |
|-----|----|----|----|----|----|----|----|----|----|----|----|----|----|----|----|----|----|----|----|----|
| n1  | Rt⊕Rb | Grt | Grb | Rt⊕Rb | Grt⊕Grb | Rt⊕Rb | Grt⊕Grb | Rt⊕Rb | Grt | Grb | Rt⊕Rb | Grt⊕Grb | Rt⊕Rb | Grt⊕Grb | Rt⊕Rb | Grt | Grb | Rt⊕Rb | Grt⊕Grb |
| n2  | Gbt⊕Gbb | Bt⊕Bb | Gbt | Gbb | Bt⊕Bb | Gbt⊕Gbb | Bt⊕Bb | Gbt⊕Gbb | Bt⊕Bb | Gbt⊕Gbb | Bt⊕Bb | Gbt | Gbb | Bt⊕Bb |
| n3  | Rt⊕Rb | Grt | Grb | Rt⊕Rb | Grt⊕Grb | Rt⊕Rb | Grt⊕Grb | Rt⊕Rb | Grt | Grb | Rt⊕Rb | Grt⊕Grb | Rt⊕Rb | Grt⊕Grb | Rt⊕Rb | Grt | Grb | Rt⊕Rb | Grt⊕Grb |
| n4  | Gbt⊕Gbb | Bt⊕Bb | Gbt | Gbb | Bt⊕Bb | Gbt⊕Gbb | Bt⊕Bb | Gbt⊕Gbb | Bt⊕Bb | Gbt⊕Gbb | Bt⊕Bb | Gbt | Gbb | Bt⊕Bb |
| n5  | Rt⊕Rb | Grt | Grb | Rt⊕Rb | Grt⊕Grb | Rt⊕Rb | Grt⊕Grb | Rt⊕Rb | Grt | Grb | Rt⊕Rb | Grt⊕Grb | Rt⊕Rb | Grt⊕Grb | Rt⊕Rb | Grt | Grb | Rt⊕Rb | Grt⊕Grb |
| n6  | Gbt⊕Gbb | Bt⊕Bb | Gbt | Gbb | Bt⊕Bb | Gbt⊕Gbb | Bt⊕Bb | Gbt⊕Gbb | Bt⊕Bb | Gbt⊕Gbb | Bt⊕Bb | Gbt | Gbb | Bt⊕Bb |
| n7  | Rt⊕Rb | Grt | Grb | Rt⊕Rb | Grt⊕Grb | Rt⊕Rb | Grt⊕Grb | Rt⊕Rb | Grt | Grb | Rt⊕Rb | Grt⊕Grb | Rt⊕Rb | Grt⊕Grb | Rt⊕Rb | Grt | Grb | Rt⊕Rb | Grt⊕Grb |
| n8  | Gbt⊕Gbb | Bt⊕Bb | Gbt | Gbb | Bt⊕Bb | Gbt⊕Gbb | Bt⊕Bb | Gbt⊕Gbb | Bt⊕Bb | Gbt⊕Gbb | Bt⊕Bb | Gbt | Gbb | Bt⊕Bb |
| n9  | Rt⊕Rb | Grt | Grb | Rt⊕Rb | Grt⊕Grb | Rt⊕Rb | Grt⊕Grb | Rt⊕Rb | Grt | Grb | Rt⊕Rb | Grt⊕Grb | Rt⊕Rb | Grt⊕Grb | Rt⊕Rb | Grt | Grb | Rt⊕Rb | Grt⊕Grb |
| n10 | Gbt⊕Gbb | Bt⊕Bb | Gbt | Gbb | Bt⊕Bb | Gbt⊕Gbb | Bt⊕Bb | Gbt⊕Gbb | Bt⊕Bb | Gbt⊕Gbb | Bt⊕Bb | Gbt | Gbb | Bt⊕Bb |
| n11 | Rt⊕Rb | Grt | Grb | Rt⊕Rb | Grt⊕Grb | Rt⊕Rb | Grt⊕Grb | Rt⊕Rb | Grt | Grb | Rt⊕Rb | Grt⊕Grb | Rt⊕Rb | Grt⊕Grb | Rt⊕Rb | Grt | Grb | Rt⊕Rb | Grt⊕Grb |
| n12 | Gbt⊕Gbb | Bt⊕Bb | Gbt | Gbb | Bt⊕Bb | Gbt⊕Gbb | Bt⊕Bb | Gbt⊕Gbb | Bt⊕Bb | Gbt⊕Gbb | Bt⊕Bb | Gbt | Gbb | Bt⊕Bb |
| n13 | Rt⊕Rb | Grt | Grb | Rt⊕Rb | Grt⊕Grb | Rt⊕Rb | Grt⊕Grb | Rt⊕Rb | Grt | Grb | Rt⊕Rb | Grt⊕Grb | Rt⊕Rb | Grt⊕Grb | Rt⊕Rb | Grt | Grb | Rt⊕Rb | Grt⊕Grb |
| n14 | Gbt⊕Gbb | Bt⊕Bb | Gbt | Gbb | Bt⊕Bb | Gbt⊕Gbb | Bt⊕Bb | Gbt⊕Gbb | Bt⊕Bb | Gbt⊕Gbb | Bt⊕Bb | Gbt | Gbb | Bt⊕Bb |

FIG. 12

|     | m1 | m2 | m3 | m4 | m5 | m6 | m7 | m8 | m9 | m10 | m11 | m12 |
|-----|----|----|----|----|----|----|----|----|----|-----|-----|-----|
| n1  | R  | R  | Gr | R  | Gr | R  | R  | Gr | Grt | Grb | Grt | Grb |
| n2  | Gb | B  | B  | Gb | B  | Gb | B  | B  | Gbt | Gbb | Gbt | Gbb |
| n3  | R  | R  | Gr | R  | Gr | R  | R  | Gr | Grt | Grb | Grt | Grb |
| n4  | Gb | B  | B  | Gb | B  | Gb | B  | B  | Gbt | Gbb | Gbt | Gbb |
| n5  | R  | R  | Gr | R  | Gr | R  | R  | Gr | Grt | Grb | Grt | Grb |
| n6  | Gb | B  | B  | Gb | B  | Gb | B  | B  | Gbt | Gbb | Gbt | Gbb |
| n7  | R  | R  | Gr | R  | Gr | R  | R  | Gr | Grt | Grb | Grt | Grb |
| n8  | Gb | B  | B  | Gb | B  | Gb | B  | B  | Gbt | Gbb | Gbt | Gbb |
| n9  | R  | R  | Gr | R  | Gr | R  | R  | Gr | Grt | Grb | Grt | Grb |
| n10 | Gb | B  | B  | Gb | B  | Gb | B  | B  | Gbt | Gbb | Gbt | Gbb |
| n11 | R  | R  | Gr | R  | Gr | R  | R  | Gr | Grt | Grb | Grt | Grb |
| n12 | Gb | B  | B  | Gb | B  | Gb | B  | B  | Gbt | Gbb | Gbt | Gbb |
| n13 | R  | R  | Gr | R  | Gr | R  | R  | Gr | Grt | Grb | Grt | Grb |
| n14 | Gb | B  | B  | Gb | B  | Gb | B  | B  | Gbt | Gbb | Gbt | Gbb |

FIG. 13

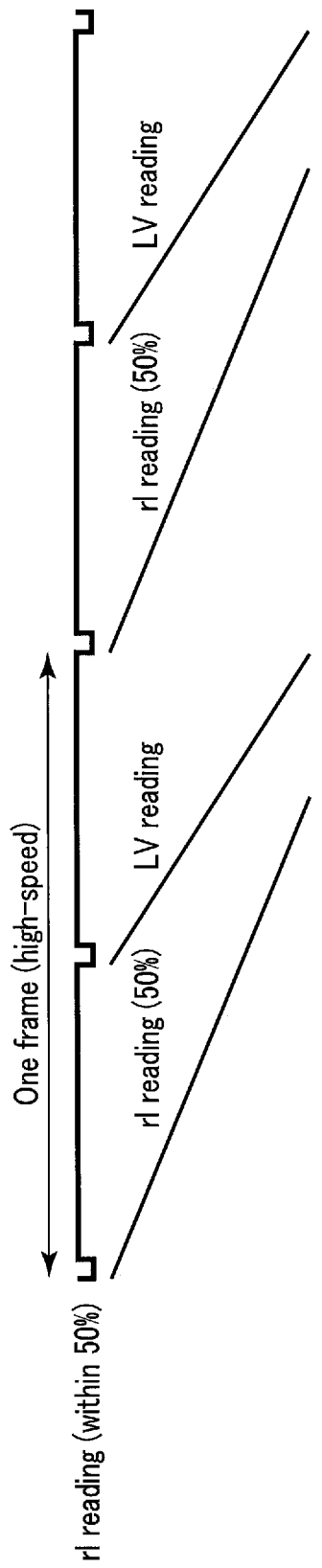
F I G. 14A

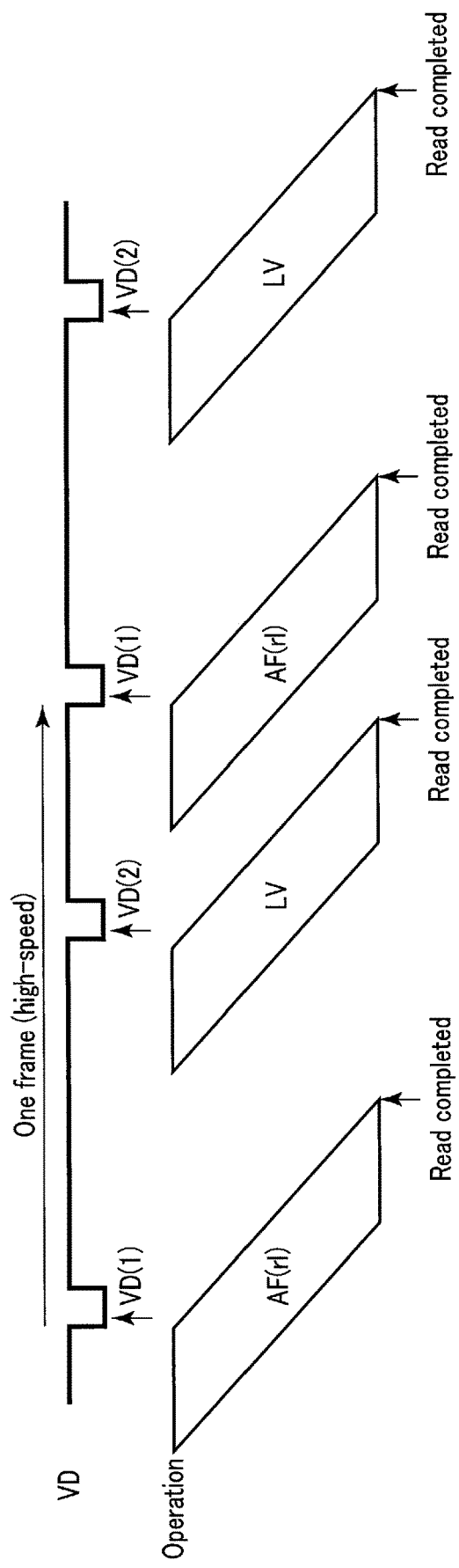
F I G. 16

|     | m1  | m2  | m3  | m4  | m5  | m6  | m7  | m8  | m9  | m10 | m11 | m12 | m13 | m14 | m15 | m16 | m17 | m18 | m19 | m20 |
|-----|-----|-----|-----|-----|-----|-----|-----|-----|-----|-----|-----|-----|-----|-----|-----|-----|-----|-----|-----|-----|
| n1  | Rl  | Rr  | Grl | Grr | Rl  | Rr  | Grl | Grr | Rl  | Rr  | Grl | Grr | Rl  | Rr  | Grl | Grr | Rl  | Rr  | Grl | Grr |
| n2  | Gbl | Gbr | Bl  | Br  | Gbl | Gbr | Bl  | Br  | Gbl | Gbr | Bl  | Br  | Gbl | Gbr | Bl  | Br  | Gbl | Gbr | Bl  | Br  |
| n3  | Rl  | Rr  | Grl | Grr | Rl  | Rr  | Grl | Grr | Rl  | Rr  | Grl | Grr | Rl  | Rr  | Grl | Grr | Rl  | Rr  | Grl | Grr |
| n4  | Gbl | Gbr | Bl  | Br  | Gbl | Gbr | Bl  | Br  | Gbl | Gbr | Bl  | Br  | Gbl | Gbr | Bl  | Br  | Gbl | Gbr | Bl  | Br  |
| n5  | Rl  | Rr  | Grl | Grr | Rl  | Rr  | Grl | Grr | Rl  | Rr  | Grl | Grr | Rl  | Rr  | Grl | Grr | Rl  | Rr  | Grl | Grr |
| n6  | Gbl | Gbr | Bl  | Br  | Gbl | Gbr | Bl  | Br  | Gbl | Gbr | Bl  | Br  | Gbl | Gbr | Bl  | Br  | Gbl | Gbr | Bl  | Br  |
| n7  | Rl  | Rr  | Grl | Grr | Rl  | Rr  | Grl | Grr | Rl  | Rr  | Grl | Grr | Rl  | Rr  | Grl | Grr | Rl  | Rr  | Grl | Grr |
| n8  | Gbl | Gbr | Bl  | Br  | Gbl | Gbr | Bl  | Br  | Gbl | Gbr | Bl  | Br  | Gbl | Gbr | Bl  | Br  | Gbl | Gbr | Bl  | Br  |
| n9  | Rl  | Rr  | Grl | Grr | Rl  | Rr  | Grl | Grr | Rl  | Rr  | Grl | Grr | Rl  | Rr  | Grl | Grr | Rl  | Rr  | Grl | Grr |
| n10 | Gbl | Gbr | Bl  | Br  | Gbl | Gbr | Bl  | Br  | Gbl | Gbr | Bl  | Br  | Gbl | Gbr | Bl  | Br  | Gbl | Gbr | Bl  | Br  |
| n11 | Rl  | Rr  | Grl | Grr | Rl  | Rr  | Grl | Grr | Rl  | Rr  | Grl | Grr | Rl  | Rr  | Grl | Grr | Rl  | Rr  | Grl | Grr |
| n12 | Gbl | Gbr | Bl  | Br  | Gbl | Gbr | Bl  | Br  | Gbl | Gbr | Bl  | Br  | Gbl | Gbr | Bl  | Br  | Gbl | Gbr | Bl  | Br  |
| n13 | Rl  | Rr  | Grl | Grr | Rl  | Rr  | Grl | Grr | Rl  | Rr  | Grl | Grr | Rl  | Rr  | Grl | Grr | Rl  | Rr  | Grl | Grr |
| n14 | Gbl | Gbr | Bl  | Br  | Gbl | Gbr | Bl  | Br  | Gbl | Gbr | Bl  | Br  | Gbl | Gbr | Bl  | Br  | Gbl | Gbr | Bl  | Br  |
| n15 | Rl  | Rr  | Grl | Grr | Rl  | Rr  | Grl | Grr | Rl  | Rr  | Grl | Grr | Rl  | Rr  | Grl | Grr | Rl  | Rr  | Grl | Grr |
| n16 | Gbl | Gbr | Bl  | Br  | Gbl | Gbr | Bl  | Br  | Gbl | Gbr | Bl  | Br  | Gbl | Gbr | Bl  | Br  | Gbl | Gbr | Bl  | Br  |
| n17 | Rl  | Rr  | Grl | Grr | Rl  | Rr  | Grl | Grr | Rl  | Rr  | Grl | Grr | Rl  | Rr  | Grl | Grr | Rl  | Rr  | Grl | Grr |
| n18 | Gbl | Gbr | Bl  | Br  | Gbl | Gbr | Bl  | Br  | Gbl | Gbr | Bl  | Br  | Gbl | Gbr | Bl  | Br  | Gbl | Gbr | Bl  | Br  |
| n19 | Rl  | Rr  | Grl | Grr | Rl  | Rr  | Grl | Grr | Rl  | Rr  | Grl | Grr | Rl  | Rr  | Grl | Grr | Rl  | Rr  | Grl | Grr |
| n20 | Gbl | Gbr | Bl  | Br  | Gbl | Gbr | Bl  | Br  | Gbl | Gbr | Bl  | Br  | Gbl | Gbr | Bl  | Br  | Gbl | Gbr | Bl  | Br  |
| n21 | Rl  | Rr  | Grl | Grr | Rl  | Rr  | Grl | Grr | Rl  | Rr  | Grl | Grr | Rl  | Rr  | Grl | Grr | Rl  | Rr  | Grl | Grr |
| n22 | Gbl | Gbr | Bl  | Br  | Gbl | Gbr | Bl  | Br  | Gbl | Gbr | Bl  | Br  | Gbl | Gbr | Bl  | Br  | Gbl | Gbr | Bl  | Br  |
| n23 | Rl  | Rr  | Grl | Grr | Rl  | Rr  | Grl | Grr | Rl  | Rr  | Grl | Grr | Rl  | Rr  | Grl | Grr | Rl  | Rr  | Grl | Grr |
| n24 | Gbl | Gbr | Bl  | Br  | Gbl | Gbr | Bl  | Br  | Gbl | Gbr | Bl  | Br  | Gbl | Gbr | Bl  | Br  | Gbl | Gbr | Bl  | Br  |
| n25 | Rl  | Rr  | Grl | Grr | Rl  | Rr  | Grl | Grr | Rl  | Rr  | Grl | Grr | Rl  | Rr  | Grl | Grr | Rl  | Rr  | Grl | Grr |
| n26 | Gbl | Gbr | Bl  | Br  | Gbl | Gbr | Bl  | Br  | Gbl | Gbr | Bl  | Br  | Gbl | Gbr | Bl  | Br  | Gbl | Gbr | Bl  | Br  |
| n27 | Rl  | Rr  | Grl | Grr | Rl  | Rr  | Grl | Grr | Rl  | Rr  | Grl | Grr | Rl  | Rr  | Grl | Grr | Rl  | Rr  | Grl | Grr |
| n28 | Gbl | Gbr | Bl  | Br  | Gbl | Gbr | Bl  | Br  | Gbl | Gbr | Bl  | Br  | Gbl | Gbr | Bl  | Br  | Gbl | Gbr | Bl  | Br  |

F I G. 17

|    | m1  | m2  | m3  | m4  | m5  | m6  |
|----|-----|-----|-----|-----|-----|-----|
| n1 | Grl | Grr | Grl | Grr | Grl | Grr |
| n2 | Gbl | Gbr | Gbl | Gbr | Gbl | Gbr |
| n3 | Grl | Grr | Grl | Grr | Grl | Grr |
| n4 | Gbl | Gbr | Gbl | Gbr | Gbl | Gbr |
| n5 | Grl | Grr | Grl | Grr | Grl | Grr |
| n6 | Gbl | Gbr | Gbl | Gbr | Gbl | Gbr |

|     | m1 | m2 | m3 | m4 | m5 | m6 | m7 | m8 | m9 | m10 | m11 | m12 | m13 | m14 | m15 | m16 | m17 | m18 | m19 | m20 |
|-----|----|----|----|----|----|----|----|----|----|-----|-----|-----|-----|-----|-----|-----|-----|-----|-----|-----|
| n1  | Rt⊕Rb | Grt⊕Grb | Rt⊕Rb | Grt⊕Grb | Rt⊕Rb | Grt⊕Grb | Rt⊕Rb | Grt⊕Grb | Rt⊕Rb | Grt⊕Grb |
| n2  | Gbt⊕Gbb | Bt⊕Bb | Gbt⊕Gbb | Bt⊕Bb | Gbt⊕Gbb | Bt⊕Bb | Gbt⊕Gbb | Bt⊕Bb | Gbt⊕Gbb | Bt⊕Bb |
| n3  | Rt⊕Rb | Grt⊕Grb | Rt⊕Rb | Grt⊕Grb | Rt⊕Rb | Grt⊕Grb | Rt⊕Rb | Grt⊕Grb | Rt⊕Rb | Grt⊕Grb |
| n4  | Gbt⊕Gbb | Bt⊕Bb | Gbt⊕Gbb | Bt⊕Bb | Gbt⊕Gbb | Bt⊕Bb | Gbt⊕Gbb | Bt⊕Bb | Gbt⊕Gbb | Bt⊕Bb |
| n5  | Rt⊕Rb | Grt⊕Grb | Rt⊕Rb | Grt⊕Grb | Rt⊕Rb | Grt⊕Grb | Rt⊕Rb | Grt⊕Grb | Rt⊕Rb | Grt⊕Grb |
| n6  | Gbt⊕Gbb | Bt⊕Bb | Gbt⊕Gbb | Bt⊕Bb | Gbt⊕Gbb | Bt⊕Bb | Gbt⊕Gbb | Bt⊕Bb | Gbt⊕Gbb | Bt⊕Bb |
| n7  | Rt⊕Rb | Grt⊕Grb | Rt⊕Rb | Grt⊕Grb | Rt⊕Rb | Grt⊕Grb | Rt⊕Rb | Grt⊕Grb | Rt⊕Rb | Grt⊕Grb |
| n8  | Gbt⊕Gbb | Bt⊕Bb | Gbt⊕Gbb | Bt⊕Bb | Gbt⊕Gbb | Bt⊕Bb | Gbt⊕Gbb | Bt⊕Bb | Gbt⊕Gbb | Bt⊕Bb |
| n9  | Rt⊕Rb | Grt⊕Grb | Rt⊕Rb | Grt⊕Grb | Rt⊕Rb | Grt⊕Grb | Rt⊕Rb | Grt⊕Grb | Rt⊕Rb | Grt⊕Grb |
| n10 | Gbt⊕Gbb | Bt⊕Bb | Gbt⊕Gbb | Bt⊕Bb | Gbt⊕Gbb | Bt⊕Bb | Gbt⊕Gbb | Bt⊕Bb | Gbt⊕Gbb | Bt⊕Bb |
| n11 | Rt⊕Rb | Grt⊕Grb | Rt⊕Rb | Grt⊕Grb | Rt⊕Rb | Grt⊕Grb | Rt⊕Rb | Grt⊕Grb | Rt⊕Rb | Grt⊕Grb |
| n12 | Gbt⊕Gbb | Bt⊕Bb | Gbt⊕Gbb | Bt⊕Bb | Gbt⊕Gbb | Bt⊕Bb | Gbt⊕Gbb | Bt⊕Bb | Gbt⊕Gbb | Bt⊕Bb |
| n13 | Rt⊕Rb | Grt⊕Grb | Rt⊕Rb | Grt⊕Grb | Rt⊕Rb | Grt⊕Grb | Rt⊕Rb | Grt⊕Grb | Rt⊕Rb | Grt⊕Grb |
| n14 | Gbt⊕Gbb | Bt⊕Bb | Gbt⊕Gbb | Bt⊕Bb | Gbt⊕Gbb | Bt⊕Bb | Gbt⊕Gbb | Bt⊕Bb | Gbt⊕Gbb | Bt⊕Bb |
| n15 | Rt⊕Rb | Grt⊕Grb | Rt⊕Rb | Grt⊕Grb | Rt⊕Rb | Grt⊕Grb | Rt⊕Rb | Grt⊕Grb | Rt⊕Rb | Grt⊕Grb |
| n16 | Gbt⊕Gbb | Bt⊕Bb | Gbt⊕Gbb | Bt⊕Bb | Gbt⊕Gbb | Bt⊕Bb | Gbt⊕Gbb | Bt⊕Bb | Gbt⊕Gbb | Bt⊕Bb |
| n17 | Rt⊕Rb | Grt⊕Grb | Rt⊕Rb | Grt⊕Grb | Rt⊕Rb | Grt⊕Grb | Rt⊕Rb | Grt⊕Grb | Rt⊕Rb | Grt⊕Grb |
| n18 | Gbt⊕Gbb | Bt⊕Bb | Gbt⊕Gbb | Bt⊕Bb | Gbt⊕Gbb | Bt⊕Bb | Gbt⊕Gbb | Bt⊕Bb | Gbt⊕Gbb | Bt⊕Bb |
| n19 | Rt⊕Rb | Grt⊕Grb | Rt⊕Rb | Grt⊕Grb | Rt⊕Rb | Grt⊕Grb | Rt⊕Rb | Grt⊕Grb | Rt⊕Rb | Grt⊕Grb |
| n20 | Gbt⊕Gbb | Bt⊕Bb | Gbt⊕Gbb | Bt⊕Bb | Gbt⊕Gbb | Bt⊕Bb | Gbt⊕Gbb | Bt⊕Bb | Gbt⊕Gbb | Bt⊕Bb |
| n21 | Rt⊕Rb | Grt⊕Grb | Rt⊕Rb | Grt⊕Grb | Rt⊕Rb | Grt⊕Grb | Rt⊕Rb | Grt⊕Grb | Rt⊕Rb | Grt⊕Grb |
| n22 | Gbt⊕Gbb | Bt⊕Bb | Gbt⊕Gbb | Bt⊕Bb | Gbt⊕Gbb | Bt⊕Bb | Gbt⊕Gbb | Bt⊕Bb | Gbt⊕Gbb | Bt⊕Bb |
| n23 | Rt⊕Rb | Grt⊕Grb | Rt⊕Rb | Grt⊕Grb | Rt⊕Rb | Grt⊕Grb | Rt⊕Rb | Grt⊕Grb | Rt⊕Rb | Grt⊕Grb |
| n24 | Gbt⊕Gbb | Bt⊕Bb | Gbt⊕Gbb | Bt⊕Bb | Gbt⊕Gbb | Bt⊕Bb | Gbt⊕Gbb | Bt⊕Bb | Gbt⊕Gbb | Bt⊕Bb |
| n25 | Rt⊕Rb | Grt⊕Grb | Rt⊕Rb | Grt⊕Grb | Rt⊕Rb | Grt⊕Grb | Rt⊕Rb | Grt⊕Grb | Rt⊕Rb | Grt⊕Grb |
| n26 | Gbt⊕Gbb | Bt⊕Bb | Gbt⊕Gbb | Bt⊕Bb | Gbt⊕Gbb | Bt⊕Bb | Gbt⊕Gbb | Bt⊕Bb | Gbt⊕Gbb | Bt⊕Bb |
| n27 | Rt⊕Rb | Grt⊕Grb | Rt⊕Rb | Grt⊕Grb | Rt⊕Rb | Grt⊕Grb | Rt⊕Rb | Grt⊕Grb | Rt⊕Rb | Grt⊕Grb |
| n28 | Gbt⊕Gbb | Bt⊕Bb | Gbt⊕Gbb | Bt⊕Bb | Gbt⊕Gbb | Bt⊕Bb | Gbt⊕Gbb | Bt⊕Bb | Gbt⊕Gbb | Bt⊕Bb |

FIG. 20

|     | m1 | m2 | m3 | m4 | m5 | m6 | m7 | m8 | m9 | m10 | m11 | m12 | m13 | m14 |
|-----|----|----|----|----|----|----|----|----|----|-----|-----|-----|-----|-----|
| n1  | R  | Gr | R  | Gr | R  | Gr | R  | Gr | R  | Gr  | R   | Gr  | R   | Gr  |
| n2  | Gb | B  | Gb | B  | Gb | B  | Gb | B  | Gb | B   | Gb  | B   | Gb  | B   |
| n3  | R  | Gr | R  | Gr | R  | Gr | R  | Gr | R  | Gr  | R   | Gr  | R   | Gr  |
| n4  | Gb | B  | Gb | B  | Gb | B  | Gb | B  | Gb | B   | Gb  | B   | Gb  | B   |
| n5  | R  | Gr | R  | Gr | R  | Gr | R  | Gr | R  | Gr  | R   | Gr  | R   | Gr  |
| n6  | Gb | B  | Gb | B  | Gb | B  | Gb | B  | Gb | B   | Gb  | B   | Gb  | B   |
| n7  | R  | Gr | R  | Gr | R  | Gr | R  | Gr | R  | Gr  | R   | Gr  | R   | Gr  |
| n8  | Gb | B  | Gb | B  | Gb | B  | Gb | B  | Gb | B   | Gb  | B   | Gb  | B   |
| n9  | R  | Gr | R  | Gr | R  | Gr | R  | Gr | R  | Gr  | R   | Gr  | R   | Gr  |
| n10 | Gb | B  | Gb | B  | Gb | B  | Gb | B  | Gb | B   | Gb  | B   | Gb  | B   |
| n11 | R  | Gr | R  | Gr | R  | Gr | R  | Gr | R  | Gr  | R   | Gr  | R   | Gr  |
| n12 | Gb | B  | Gb | B  | Gb | B  | Gb | B  | Gb | B   | Gb  | B   | Gb  | B   |
| n13 | R  | Gr | R  | Gr | R  | Gr | R  | Gr | R  | Gr  | R   | Gr  | R   | Gr  |
| n14 | Gb | B  | Gb | B  | Gb | B  | Gb | B  | Gb | B   | Gb  | B   | Gb  | B   |

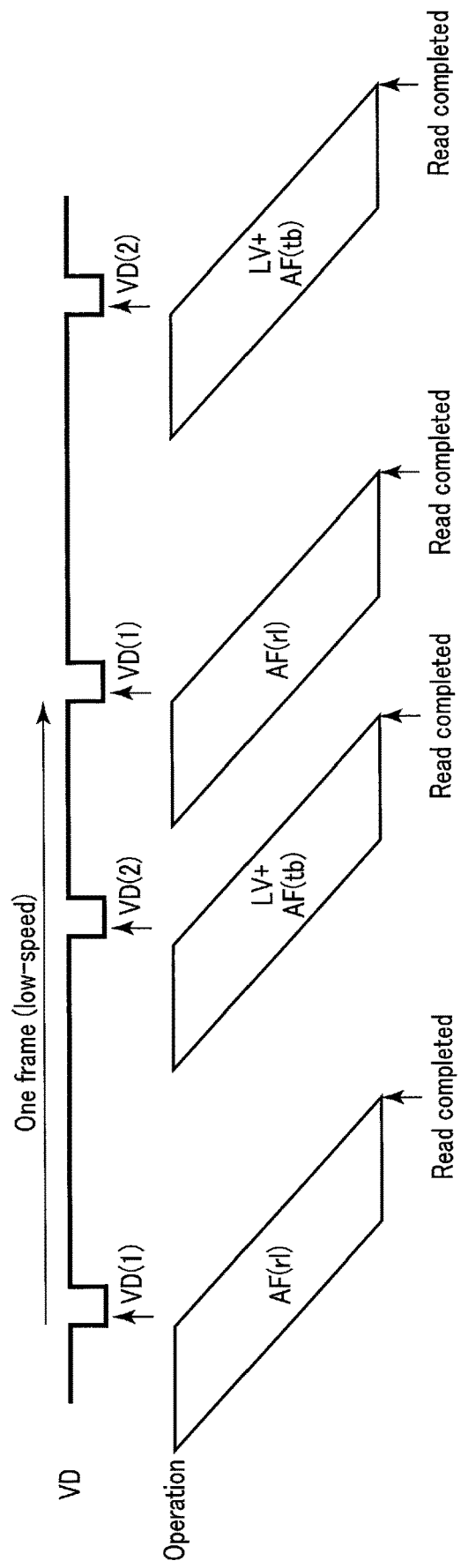
F I G. 21

FOCUS DETECTION DEVICE, FOCUS DETECTION METHOD, AND STORAGE MEDIUM STORING FOCUS DETECTION PROGRAM

CROSS-REFERENCE TO RELATED APPLICATIONS

This application is based upon and claims the benefit of priority from the prior Japanese Patent Applications No. 2017-197849, filed Oct. 11, 2017 and No. 2017-224790, filed Nov. 22, 2017, the entire contents of which are incorporated herein by reference.

BACKGROUND OF THE INVENTION

1. Field of the Invention

The present invention relates generally to a focus detection device, focus detection method, and a storage medium storing a focus detection program.

2. Description of the Related Art

A focus detection device that performs a phase difference focus detection by utilizing a pixel signal generated by an imaging element is already known. Among such types of focus detection devices, those capable of performing focus detection during a live-view display are also already known. For example, an imaging device that is suggested in Jpn. Pat. Appln. KOKAI Publication No. 2015-161906 generates pixel signals necessary for generating an image and also pixel signals necessary for performing a phase difference focus detection by changing an exposure time of a line necessary for performing the phase difference focus detection on the imaging element to an exposure time of other lines.

BRIEF SUMMARY OF THE INVENTION

According to a first aspect of the invention, there is provided a focus detection device comprising: an imaging unit including one or more pixel portions in which a plurality of light-receiving portions are arranged, the light-receiving portions being divided into a first pupil division direction and a second pupil division direction that differs from the first pupil division direction, to perform photoelectric conversion on each light flux that passes through an exit pupil region having different imaging optical systems with respect to one microlens, and to generate pixel signals; an image processor configured to perform processing to display an image based on a display pixel signal for display that is generated based on the pixel signals; a focus detection circuit configured to perform processing for focus detection based on a focus detection pixel signal for focus detection that is generated based on the pixel signals; and a control circuit configured to control the imaging unit to alternately perform a first operation and a second operation that each includes generating and reading the pixel signals, the control circuit controlling the imaging unit to generate the focus detection pixel signal regarding the first pupil division direction in the first operation, and controlling the imaging unit to generate the display pixel signal and the focus detection pixel signal regarding the second pupil division direction in the second operation.

According to a second aspect of the invention, there is provided a focus detection method using an imaging unit including one or more pixel portions in which a plurality of light-receiving portions are arranged, the light-receiving portions being divided into a first pupil division direction and a second pupil division direction that differs from the first pupil division direction, to perform photoelectric conversion on each light flux that passes through an exit pupil region having different imaging optical systems with respect to one microlens, and to generate pixel signals, the focus detection method comprising: performing processing to display an image based on a display pixel signal for display that is generated based on the pixel signals; performing processing for focus detection based on a focus detection pixel signal for focus detection that is generated based on the pixel signals; and controlling the imaging unit to alternately perform a first operation and a second operation that each includes generating and reading the pixel signals, the controlling of the imaging unit includes controlling the imaging unit to generate the focus detection pixel signal regarding the first pupil division direction in the first operation, and controlling the imaging unit to generate the display pixel signal and the focus detection pixel signal regarding the second pupil division direction in the second operation.

According to a third aspect of the invention, there is provided a computer readable non-transitory storage medium that stores a focus detection program using an imaging unit including one or more pixel portions in which a plurality of light-receiving portions are arranged, the light-receiving portions being divided into a first pupil division direction and a second pupil division direction that differs from the first pupil division direction, to perform photoelectric conversion on each light flux that passes through an exit pupil region having different imaging optical systems with respect to one microlens, and to generate pixel signals, the focus detection program comprising: performing processing to display an image based on a display pixel signal for display that is generated based on the pixel signals; performing processing for focus detection based on a focus detection pixel signal for focus detection that is generated based on the pixel signals; and controlling the imaging unit to alternately perform a first operation and a second operation, each including generation and reading of the pixel signals, the controlling of the imaging unit includes controlling the imaging unit to generate the focus detection pixel signal regarding the first pupil division direction in the first operation, and controlling the imaging unit to generate the display pixel signal and the focus detection pixel signal regarding the second pupil division direction in the second operation.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing an example of a configuration of an imaging device including a focus detection device according to each embodiment of the present invention.

FIG. 5B is a flowchart showing an operation of the imaging device according to each embodiment.

FIG. 7 shows an example of a pixel addition setting in a first operation.

FIG. 8 shows pixel data stored in DRAM by the first operation.

FIG. 12 shows a modified example of reading the pixel signal in the first embodiment.

FIG. 13 shows pixel data stored in DRAM by the reading in FIG. 12.

FIG. 14A is a diagram used to explain a third modified example in the first embodiment.

FIG. 16 is a timing chart for explaining a high-speed operation.

FIG. 17 shows an example of a setting of pixel addition of the first operation in the high-speed operation.

FIG. 18 shows pixel data stored in DRAM by the first operation in the high-speed operation.

FIG. 19 shows an example of a setting of pixel addition of the second operation in the high-speed operation.

FIG. 20 shows pixel data stored in DRAM by the second operation in the high-speed operation.

FIG. 21 is a timing chart for explaining a low-luminance operation.

FIG. 22 shows an example of a setting of pixel addition of the first operation in the low-luminance operation.

FIG. 23 shows pixel data stored in DRAM by the first operation in the low-luminance operation.

DETAILED DESCRIPTION OF THE INVENTION

Figure 2:
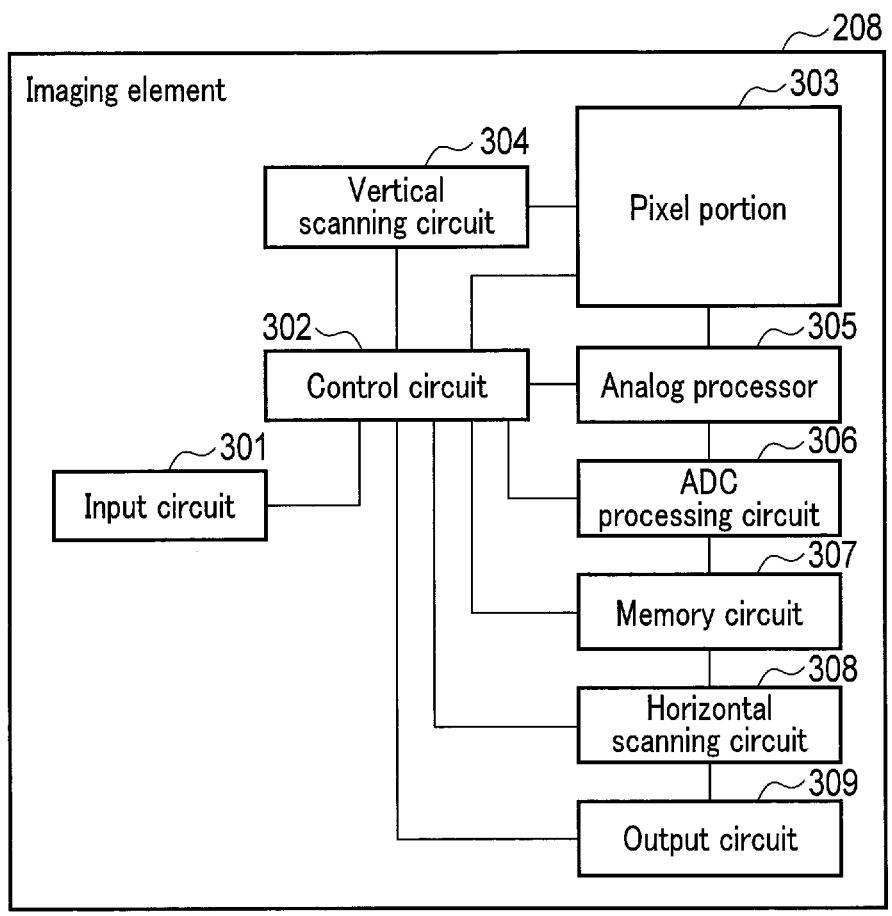
FIG. 2 shows a configuration of an imaging element of an example.

Embodiments of the present invention will be explained with reference to the drawings.

First Embodiment

FIG. 1 is a block diagram showing an example of a configuration of an imaging device including a focus detection device according to each embodiment of the present invention. In FIG. 1, a solid line with an arrow shows a flow of data, and a broken line with an arrow shows a flow of a control signal.

As shown in FIG. 1, an imaging device 1 includes an interchangeable lens 100 and a camera body 200. The interchangeable lens 100 is configured to be detachable from the camera body 200. When the interchangeable lens 100 is attached to the camera body 200, the interchangeable lens 100 and the camera body 200 are connected in a communicable manner with each other. The imaging device 1 need not necessarily be a lens-interchangeable-type imaging device. For example, the imaging device 1 may be a lens-integral-type imaging device.

The interchangeable lens 100 comprises an imaging optical system 102, a drive unit 104, a lens CPU 106, and a lens-side storage unit 108. Here, for example, each block of the interchangeable lens 100 is configured by hardware. However, each block need not necessarily be configured by hardware, and may partially be configured by software. Furthermore, each block of the interchangeable lens 100 need not be configured by a piece of hardware or software, and may be configured by a plurality of pieces of hardware or software.

The imaging optical system 102 is an optical system for forming an image of a light flux from a subject in an imaging element 208 of the camera body 200. The imaging optical system 102 includes a focus lens 1021 and an aperture 1022. The focus lens 1021 is configured to move in an optical axis direction to adjust a focal position of the imaging optical system 102.

The aperture 1022 is arranged on an optical axis of the focus lens 1021. The diameter of the aperture 1022 is variable. The aperture 1022 adjusts an amount of light flux from the subject that passes through the focus lens 1021 and enters the imaging element 208. The drive unit 104 drives the focus lens 1021 and the aperture 1022 based on a control signal that is output from the lens CPU 106. Here, the imaging optical system 102 may be configured as a zoom lens. In such case, the drive unit 104 also performs a zoom drive.

The lens CPU 106 is configured communicably with a CPU 212 of the camera body 200 through an interface (I/F) 110. The lens CPU 106 controls the drive unit 104 in accordance with the control of the CPU 212 of the camera body 200. The lens CPU 106 transmits information, such as an aperture value (F-number) of the aperture 1022 and lens information stored in the lens-side storage unit 108, to the CPU 212 through the I/F 110. The lens CPU 106 need not necessarily be configured as a CPU. That is, a function similar to that of the lens CPU 106 may be realized by ASIC and FPGA, etc. Furthermore, a function similar to that of the lens CPU 106 may also be realized by software.

The lens-side storage unit 108 stores lens information related to the interchangeable lens 100. The lens information includes, for example, information about a focal distance of the imaging optical system 102 and aberration information.

The camera body 200 includes a mechanical shutter 202, a drive unit 204, an operation unit 206, the imaging element 208, an image stabilization circuit 210, the CPU 212, an image processor 214, an image compression/expansion unit 216, a focus detection circuit 218, an exposure control circuit 220, a display 222, a bus 224, a DRAM 226, a body-side storage unit 228, and a recording medium 230. Here, for example, each block of the camera body 200 is configured by hardware. However, each block does not necessarily have to be configured by hardware, and may be partially configured by software. Furthermore, each block of the camera body 200 need not be configured by a piece of hardware or software, and may be configured by a plurality of pieces of hardware or software.

The mechanical shutter 202 is configured to be openable/closable, and adjusts an incidence time of a light flux from a subject to the imaging element 208, that is, an exposure time of the imaging element 208. As the mechanical shutter 202, for example, a focal-plane shutter is employed. The drive unit 204 drives the mechanical shutter 202 based on a control signal from the CPU 212.

The operation unit 206 includes various types of operation buttons, such as a power button, a release button, a movie button, a playback button, and a menu button, and various types of operation members, such as a touch panel. The operation unit 206 senses an operation state of various types of operation members, and outputs a signal indicating a sense result to the CPU 212.

The imaging element 208 is arranged on an optical axis of the imaging optical system 102, behind the mechanical shutter 202, and at a position where the imaging optical system 102 forms an image of the light flux from a subject. The imaging element 208 captures an image of the subject and generates a pixel signal relating to the subject. The imaging element 208 will be explained in detail later on.

The image stabilization circuit 210 moves the imaging element 208 in a direction parallel to its light-receiving surface so as to suppress shaking occurred to the camera body 200. By moving the imaging element 208 in accordance with the shaking, a blurring of a subject image which occurs on the image data caused by the shaking can be suppressed. The image stabilization circuit may also be provided on the interchangeable lens 100. In such case, the image stabilization circuit is configured to move an image stabilization optical system included in the imaging optical system 102.

The CPU 212 controls the entire camera body 200 in accordance with a program that is stored in the body-side storage unit 228. For example, the CPU 212 controls an imaging performed by the imaging element 208. The CPU 212 also outputs a control signal for driving the focus lens 1021 to the lens CPU 106, in accordance with the focus state of the focus lens 1021 that is detected by the focus detection circuit 218. The CPU 212 also outputs an exposure setting value that is calculated by the exposure control circuit 220 to the lens CPU 106 and the imaging element 208. Here, the CPU 212 need not necessarily be configured as a CPU. That is, a function similar to that of the CPU 212 may be realized by ASIC and FPGA, etc. Furthermore, a function similar to that of the CPU 212 may also be realized by software.

The image processor 214 performs various types of image processing on pixel data. For example, when capturing a still image, the image processor 214 generates still image data by applying image processing for still image recording. Similarly, when capturing a movie image, the image processor 214 generates movie image data by applying image processing for movie image recording. Furthermore, when displaying a live view, the image processor 214 generates display image data by applying image processing for display.

When recording the image data, the image compression/expansion unit 216 compresses the image data generated by the image processor 214. Such image data is still image data or movie image data. Furthermore, when reproducing the image data, the image data that is recorded in a compressed state in the recording medium 230 is expanded.

The focus detection circuit 218 performs focus detection of the focus lens 1021 by a publicly-known phase difference system using the focus detection pixel data output from the imaging element 208.

The exposure control circuit 220 serving as a photometric unit calculates an exposure setting value based on pixel data of the imaging element 208. The exposure control circuit 220 measures subject luminance from the pixel data of the imaging element 208, and calculates from the measured subject luminance an exposure setting value necessary for setting the luminance of the subject at the time of imaging to an adequate value. The exposure setting value includes an opening amount (aperture value) of the aperture 1022, and an exposure time (shutter speed) of the imaging element 208.

The display 222 is a display unit such as a liquid-crystal display or an organic EL display, and is arranged, for example, on a back surface of the camera body 200. The display 222 displays an image in accordance with the control of the CPU 212. The display 222 is used upon live-view display or display of a recorded image, etc.

The bus 224 is connected to the imaging element 208, the CPU 212, the image processor 214, the image compression/expansion unit 216, the focus detection circuit 218, the exposure control circuit 220, the display 222, the DRAM 226, the body-side storage unit 228, and the recording medium 230, and operates as a transfer path for transferring various kinds of data occurred in these blocks.

The DRAM 226 is a memory that is electrically rewritable, and temporarily stores various types of data, such as the pixel data output from the imaging element 208, the still image data, the movie image data, the display image data, and the processing data in the CPU 212. An SDRAM may also be used for temporarily storing data.

The body-side storage unit 228 stores various types of data, such as programs used in the CPU 212, and adjustment values of the camera body 200. The recording medium 230 is configured to be built or installed in the camera body 200, and records the image data for recording as an image file in a predetermined format. The DRAM 226, the body-side storage unit 228, and the recording medium 230 may be configured respectively by one memory, or by a combination of a plurality of memories, etc.

Now, the imaging element 208 will be explained. FIG. 2 shows a configuration of the imaging element 208 of the example. As shown in FIG. 2, the imaging element 208 includes an input circuit 301, a control circuit 302, a pixel portion 303, a vertical scanning circuit 304, an analog processor 305, an analog-to-digital (ADC) processing circuit 306, a memory circuit 307, a horizontal scanning circuit 308, and an output circuit 309. Here, an imaging unit in the present embodiment includes the pixel portion 303. The imaging unit may further include the vertical scanning circuit 304, the analog processor 305, the ADC processing circuit 306, and the memory circuit 307. The analog processor 305 and the ADC processing circuit 306 may also be provided outside the imaging element 208.

The input circuit 301 receives a control signal relating to an operation of the imaging element 208 from the CPU 212, and inputs the signal to the control circuit 302. The control signal relating to such an operation includes a synchronization signal, a reference clock, and an operation setting signal of the imaging element 208. The synchronization signal includes a vertical synchronization signal and a horizontal synchronization signal.

The control circuit 302 is configured by, for example, CPU or ASIC, and controls the operation of each unit of the imaging element 208 based on the control signal input from the input circuit 301.

Figure 3:
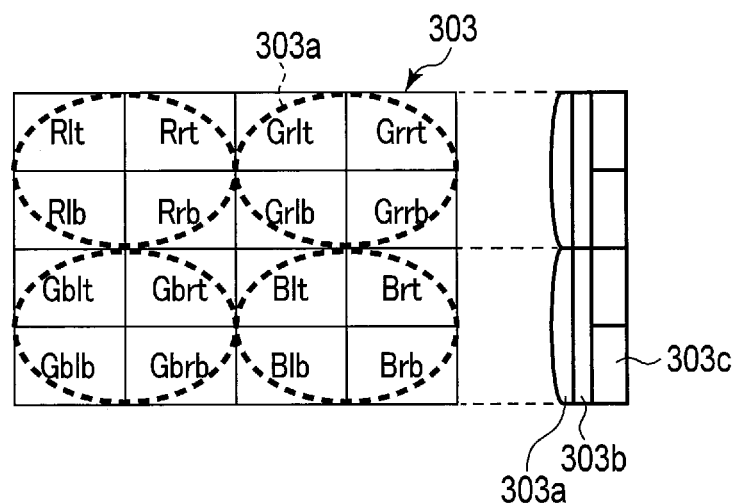
FIG. 3 shows a detailed configuration of a pixel portion.

A plurality of pixel portions 303 are arranged two-dimensionally, and generate pixel signals by performing photoelectric conversion on an incident light. FIG. 3 shows a detailed configuration of the pixel portion 303. Here, the left side of FIG. 3 shows a view of observing the pixel portion 303 from the front, and the right side of FIG. 3 shows a view of observing the pixel portion 303 from the side. As shown in FIG. 3, the pixel portion 303 includes microlenses 303a, colors filter 303b, and pixels 303c.

The microlens 303a gathers the light flux that has passed through the imaging optical system 102 to a light-receiving portion of a corresponding pixel 303c. As will be explained later on, one pixel 303c is configured by four pieces of light-receiving portions that are obtained as a result of pupil-division in two horizontal pieces times two vertical pieces. The microlens 303a gathers light fluxes that have passed through different exit pupil regions of the imaging optical system 102 to different light-receiving portions.

The color filter 303b is, for example, a color filter in a Bayer array of primary colors. The Bayer array of primary colors is an array obtained by alternately arranging a line in which a red (R) filter and a green (Gr) filter are alternately arrayed, and a line in which a blue (B) filter and a green (Gb) filter are alternately arrayed in a column direction. As shown in FIG. 3, one color of the color filter 303b corresponds to one piece of the pixel 303c. Accordingly, a light of the same color enters four pieces of light-receiving portions that configure the pixel 303c. The color filter 303b need not necessarily be a color filter of the Bayer array of primary colors.

The pixel 303c is configured by four pieces of light-receiving portions lt, rt, lb, and rb that are divided and arranged respectively in a horizontal direction that is a first pupil division direction, and a vertical direction that is a second pupil division direction. In the drawing, "lt", "rt", "lb", and "rb" are denoted along with "R", "Gr", "Gb", and "B" that express the color of the color filter. The light-receiving portion lt, rt, lb, and rb receive a light flux that exits from the same portion of the subject. Each of the light-receiving portions lt, rt, lb, and rb is configured by, for example, a photo-diode, and outputs a pixel signal corresponding to an electric charge accumulated in accordance with the received light flux. Here, among the emitted light fluxes, the light-receiving portion lt receives a light flux that has passed through an exit pupil region on the bottom right of the imaging optical system 102. Among the emitted light fluxes, the light-receiving portion rt receives a light flux that has passed through an exit pupil region on the bottom left of the imaging optical system 102. Among the emitted light fluxes, the light-receiving portion lb receives a light flux that has passed through an exit pupil region on the upper right of the imaging optical system 102. Among the emitted light fluxes, the light-receiving portion rb receives a light flux that has passed through an exit pupil region on the upper left of the imaging optical system 102.

Since the pixel 303c has a structure that is divided into four pieces of light-receiving portions lt, rt, lb, and rb, the pixel 303c can be treated as both a left and right-opening pixel and a top and bottom-opening pixel for a phase difference detection. The left and right-opening pixel is a pair of pixels, one of which receives a light flux that has passed through an exit pupil region on the left side of the imaging optical system, and the other of which receives a light flux that has passed through an exit pupil region on the right side of the imaging optical system. The top and bottom-opening pixel is a pair of pixels, one of which receives a light flux that has passed through an exit pupil region on the upper side of the imaging optical system, and the other of which receives a light flux that has passed through an exit pupil region on the lower side of the imaging optical system. Whether to treat the pixel 303c as the left and right-opening pixel or the top and bottom-opening pixel is switched depending on the control signal from the control circuit 302.

Figure 4A:
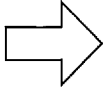
FIG. 4A shows a diagram of adding pixel signals when treating pixels as left and right-opening pixels.

When the pixel 303c is treated as the left and right-opening pixel, in the manner shown on the left side of FIG. 4A, the control circuit 302 adds or mixes pixel signals of the light-receiving portions lt (Rlt, Grlt, Gblt, Blt) and pixel signals of the light-receiving portions lb (Rlb, Grlb, Gblb, Blb), which are the light-receiving portions on the left half before outputting them; and adds pixel signals of the light-receiving portions rt (Rrt, Grrt, Gbrt, Brt) and pixel signals of the light-receiving portions rb (Rrb, Grrb, Gbrb, Brb), which are the light-receiving portions on the right half before outputting them. In this manner, as shown on the right side of FIG. 4A, left-opening pixel signals l (Rl, Grl, Gbl, Bl) that include information of the light flux passing through the exit pupil region on the right side of the imaging optical system, and right-opening pixel signals r (Rr, Grr, Gbr, Br) that include information of the light flux passing through the exit pupil region on the left side of the imaging optical system are output respectively.

Figure 4B:
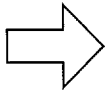
FIG. 4B shows a diagram of adding pixel signals when treating pixels as top and bottom-opening pixels.

When the pixel 303c is treated as the top and bottom-opening pixel, in the manner shown on the left side of FIG. 4B, the control circuit 302 adds or mixes pixel signals of the light-receiving portions lt (Rlt, Grlt, Gblt, Blt) and pixel signals of the light-receiving portions rt (Rrt, Grrt, Gbrt, Brt), which are the light-receiving portions on the upper half, and then outputs them; and adds pixel signals of the light-receiving portions lb (Rlb, Grlb, Gblb, Blb) and pixel signals of the light-receiving portions rb (Rrb, Grrb, Gbrb, Brb), which are the light-receiving portions on the lower half, and then outputs them. In this manner, as shown on the right side of FIG. 4B, top-opening pixel signals t (Rt, Grt, Gbt, Bt) that include information of the light flux passing through the exit pupil region on the lower side of the imaging optical system, and bottom-opening pixel signals b (Rb, Grb, Gbb, Bb) that include information of the light flux passing through the exit pupil region on the upper side of the imaging optical system are output, respectively.

Furthermore, the pixel portion 303 of the present embodiment may also be configured in a manner in which the pixel signals can be added and output even between different pixel portions 303. For example, the pixel portion 303 may also be configured in a manner that pixel signals between a plurality of left-opening pixels or right-opening pixels existing in a horizontal direction or a vertical direction are added and output, or in a manner in which pixel signals between a plurality of top-opening pixels or bottom-opening pixels existing in a horizontal direction or a vertical direction are added and output. The number of pixel signals to be added is set by, for example, the control circuit 302. By adding the pixel signals, then reading them out, a read time can be shortened. If there is sufficient read time, the pixel signals need not be added between the pixel portions 303.

Every time an accumulation start signal is received as a control signal from the control circuit 302, the vertical scanning circuit 304 resets the electric charge accumulated in the pixels 303c of the pixel portions 303 for each line, and then begins to accumulate an electric charge in the pixel portion 303. Furthermore, every time an accumulation end signal is received as a control signal from the control circuit 302, the vertical scanning circuit 304 ends the accumulation of the electric charge in the pixels 303c of the pixel portions 303 for each line, and transfers the accumulated electric charges as the pixel signals to the analog processor 305.

The analog processor 305 performs analog processing on the pixel signals transferred in sequence from the pixel portions 303. The analog processor 305 includes, for example, a preamplifier that amplifies the pixel signals in an analog manner, and a correlation double sampling (CDS) processing circuit that removes a reset noise from the pixel signals.

The ADC processing circuit 306 converts the pixel signal output from the analog processor 305 into pixel data (which is a digital signal), in accordance with the control signal from the control circuit 302. The ADC processing circuit 306 is configured as, for example, a column-type ADC processing circuit.

The memory circuit 307 temporarily stores the pixel data output from the ADC processing circuit 306 in accordance with the control signal from the control circuit 302. The memory circuit 307 is configured by a volatile memory, etc. The memory circuit 307 may be configured to perform digital addition of the pixel data. In this case, the memory circuit 307 is configured to store an addition value of the pixel data output from the ADC processing circuit 306.

The horizontal scanning circuit 308 receives the control signal from the control circuit 302, and transfers the pixel data stored in the memory circuit 307 to the output circuit 309 in a column order.

The output circuit 309 arrays the pixel data transferred by the horizontal scanning circuit 308, and generates a pixel data string. Furthermore, the output circuit 309 converts the pixel data string into a predetermined output signal format of such as a serial signal and a differential signal, and outputs it.

Figure 5A:
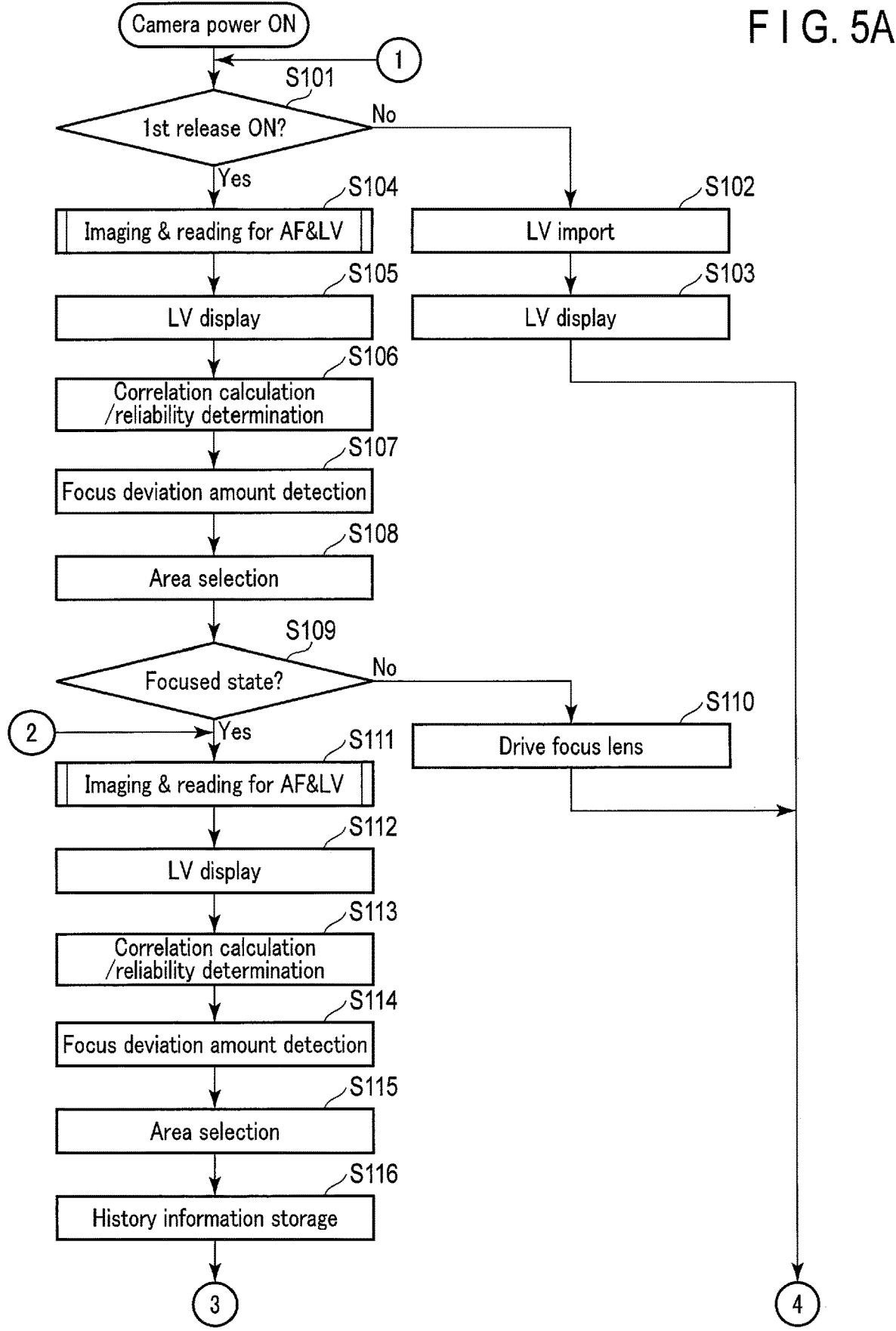
FIG. 5A is a flowchart showing an operation of the imaging device according to each embodiment.

Hereinafter, an operation of the imaging device 1 of the present embodiment will be explained. FIG. 5A and FIG. 5B are flowcharts showing the operation of the imaging device according to each embodiment. Here, FIG. 5A and FIG. 5B show an operation of when an AF mode of the imaging device 1 is a continuous AF mode. The continuous AF mode is an AF mode that is suitable for a moving subject, and that continues focusing on the movement of the subject.

The operation shown in FIG. 5A and FIG. 5B is started when detecting a user performing a power-ON operation of the imaging device 1. When the power-ON operation is detected, in step S101, the CPU 212 determines whether or not a first release switch of a release button is in an ON-state. The first release switch is a switch that is turned on in response to, for example, a half-pressed operation of the release button by the user. In step S101, when the first release switch is determined as being in an ON-state, the processing proceeds to step S104. In step S101, when the first release switch is determined as not being in an ON-state, the processing proceeds to step S102.

In step S102, the CPU 212 imports display pixel data for a live view (LV) display. Here, the CPU 212 outputs a control signal to the drive unit 204 so that the mechanical shutter 202 reaches a fully-open state, and outputs a control signal to the lens CPU 106 so that the aperture 1022 is driven by a predetermined amount (for example, open aperture). Subsequently, the CPU 212 outputs a control signal to the imaging element 208 and causes the imaging element 208 to start imaging for the LV display. Every time the imaging for the LV display is completed, the control circuit 302 begins to have the pixel signals read from the pixel portions 303. When reading the pixel signals, the control circuit 302 may cause the pixel signals of the same opening (same color) output from the pixels 303c of the pixel portions 303 to be added. The display pixel data output from the imaging element 208 is stored in the DRAM 226.

In step S103, the CPU 212 performs the LV display. Here, the CPU 212 causes the image processor 214 to generate display image data. Thereby, the image processor 214 performs necessary processing on the display pixel data, and generates the display image data for display.

The display image data is obtained by calculating arithmetic mean of the pixel data of the light-receiving portions lt, rt, lb, and rb that belong to the same pixel portion 303. The CPU 212 has an LV image displayed on the display 222 based on the display image data generated by the image processor 214. Subsequently, the processing proceeds to step S126.

In step S104, the CPU 212 performs imaging and, reading for the auto focus (AF) and LV display. The imaging and reading processing for the AF and LV display of step S104 will be explained in detail later on. Here, the explanation will continue by supposing that the focus detection pixel data for the AF is stored in the DRAM 226 by the imaging and reading for the AF, and that the display pixel data for display is stored in the DRAM 226 by the imaging and reading for the LV.

In step S105, the CPU 212 performs the LV display.

In step S106, the CPU 212 executes a focus detection calculation by the focus detection circuit 218. The focus detection circuit 218 performs correlation calculation with the focus detection pixel data that forms a pair among the focus detection pixel data stored in the DRAM 226. The focus detection pixel data that forms a pair in the case of the phase difference detection in the horizontal direction is left-opening pixel data l and right-opening pixel data r, and the focus detection pixel data that forms a pair in the case of the phase difference detection in the vertical direction is top-opening pixel data t and bottom-opening pixel data b. After the correlation calculation, the focus detection circuit 218 performs reliability determination of the focus detection. The reliability determination is made based on, for example, a contrast obtained from the pixel data or a correlation value obtained as a result of the correlation calculation.

In step S107, the focus detection circuit 218 performs a focus deviation amount calculation. As a result of the reliability determination in step S106, the focus detection circuit 218 calculates the focus deviation amount with respect to a focusing position of the focus lens 1021 from an interval value of two images in a focus detection region that is determined to be highly reliable, i.e., an image deviation amount corresponding to an extreme value of the correlation value. Subsequently, the processing proceeds to step S108.

In step S108, the focus detection circuit 218 performs area selection processing for selecting a focus detection region that corresponds to a focus lens position used for driving the focus lens 1021. After the area selection processing, the processing proceeds to step S109. The area selection processing is performed by selecting a focus detection region that shows a focus deviation amount corresponding to, for example, a distance of the nearest subject, that is, the nearest focus lens position.

In step S109, the CPU 212 determines whether or not the focus lens 1021 is in a focused state. The determination in step S109 is performed by determining whether or not the focus deviation amount in the focus detection region selected in, for example, the area selection processing is within a preset permissible range. This focus deviation amount corresponds to a difference between the current focus lens position and the selected focus lens position. When the focus deviation amount is within the permissible range, the focus lens 1021 is determined as being in the focused state. In step S109, when the focus lens 1021 is determined as not being in the focused state, the processing proceeds to step S110. In step S109, when the focus lens 1021 is determined as being in the focused state, the processing proceeds to step S111.

In step S110, the CPU 212 outputs a control signal to the lens CPU 106 so that the focus lens 1021 is driven in accordance with the focus lens position calculated for the focus detection region selected in step S108. The lens CPU 106 receives this control signal and drives the focus lens 1021 through the drive unit 104. Subsequently, the processing proceeds to step S126.

In step S111, the CPU 212 performs imaging and reading for the auto focus (AF) and LV display in the same manner as in step S104. Here, the explanation will continue by supposing that the focus detection pixel data is stored in the DRAM 226 as a result of the imaging and reading for the AF, and that the display pixel data is stored in the DRAM 226 by the imaging and reading for the LV.

In step S112, the CPU 212 performs the LV display.

In step S113, the CPU 212 executes a focus detection calculation by the focus detection circuit 218. The focus detection circuit 218 performs correlation calculation with the focus detection pixel data that forms a pair among the focus detection pixel data stored in the DRAM 226. After the correlation calculation, the focus detection circuit 218 performs reliability determination of the focus detection. In step S114, the focus detection circuit 218 performs a focus deviation amount calculation. In step S115, the focus detection circuit 218 performs area selection processing.

In step S116, the focus detection circuit 218 stores information related to the focus detection in, for example, the DRAM 226 as history information. The information related to the focus detection includes, for example, the information of the focus deviation amount calculated in step S114, and the information of the focus detection region selected in step S115.

In step S117, the CPU 212 determines whether or not a second release switch has been turned on. The second release switch is a switch that is turned on in response to, for example, a fully-pressed operation of the release button by the user. In step S117, when the second release switch is determined as not being in an ON-state, the processing proceeds to step S118. In step S117, when the second release switch is determined as being in an ON-state, the processing proceeds to step S120.

In step S118, the CPU 212 determines whether or not the focus lens 1021 is in a focused state. In step S118, when the focus lens 1021 is determined as not being in the focused state, the processing proceeds to step S119. In step S118, when the focus lens 1021 is determined as being in the focused state, the processing proceeds to step S125.

In step S119, the CPU 212 outputs a control signal to the lens CPU 106 so that the focus lens 1021 is driven in accordance with the focus lens position calculated for the focus detection region selected in step S115. The lens CPU 106 receives this control signal and drives the focus lens 1021 through the drive unit 104. Subsequently, the processing proceeds to step S125.

In step S120, the CPU 212 executes a moving object prediction calculation by the focus detection circuit 218. Thereby, the focus detection circuit 218 performs the moving object prediction calculation. The moving object prediction calculation is a form of processing that predicts a position at which the current focus lens 1021 should be driven from the history of the focus lens position resulting from the past focus deviation amount calculation stored in step S116.

In step S121, the CPU 212 starts the operation of the mechanical shutter 202 in order to perform imaging (main exposure) to acquire a still image. The operation of the mechanical shutter 202 includes an open/close operation of the mechanical shutter 202 before and after the main exposure, and a fully-open operation of the mechanical shutter 202 for starting imaging for the live view and AF after the main exposure. The CPU 212 first switches the control signal of the drive unit 204 so that the mechanical shutter 202 reaches a fully-closed state. After the main exposure is performed in step S123, the CPU 212 controls the drive unit 204 so that the mechanical shutter 202 reaches a fully-open state.

In step S122, the CPU 212 instructs the lens CPU 106 to simultaneously drive the focus lens 1021 and the aperture 1022, and starts the operation. Here, the drive position of the focus lens 1021 is at a position predicted by the moving object prediction calculation in step S120. Furthermore, the opening amount of the aperture 1022 is an opening amount corresponding to the aperture value which has been calculated based on the subject luminance measured by the last photometric calculation.

In step S123, the CPU 212 starts the main exposure. The main exposure is an imaging for acquiring image data for recording. In the main exposure, the CPU 212 starts the imaging of the imaging element 208. After ending an exposure period, the control circuit 302 reads pixel signals from each of the light-receiving portions of the imaging element 208. After reading the pixel signals, the CPU 212 causes the image processor 214 to perform processing for generating the still image data for recording. Thereby, the image processor 214 performs the processing necessary for generating the image data for recording, and generates the still image data for recording. After completing the image processing, the CPU 212 compresses the still image data for recording by the image compression/expansion unit 216. After completing the compression, the CPU 212 records the compressed still image data for recording in the recording medium 230 as an image file.

In step S124, the CPU 212 instructs the lens CPU 106 to open the aperture 1022.

In step S125, the CPU 212 determines whether or not the first release switch is in an ON-state. In step S125, when the first release switch is determined as being in an ON-state, the processing returns to step S111. In step S125, when the first release switch is determined as not being in an ON-state, the processing proceeds to step S126.

In step S126, the CPU 212 determines whether or not to turn off the power of the camera body 200. For example, in the case where the power is instructed to be turned off by a user's operation of the operation unit 206, or in the case where the user's operation of the operation unit 206 is absent for a predetermined period of time, the power is determined to be turned off. In step S126, when the power of the camera body 200 is determined not to be turned off, the processing returns to step S101. In step S126, when the power of the camera body 200 is determined to be turned off, the processing ends.

Figure 6:
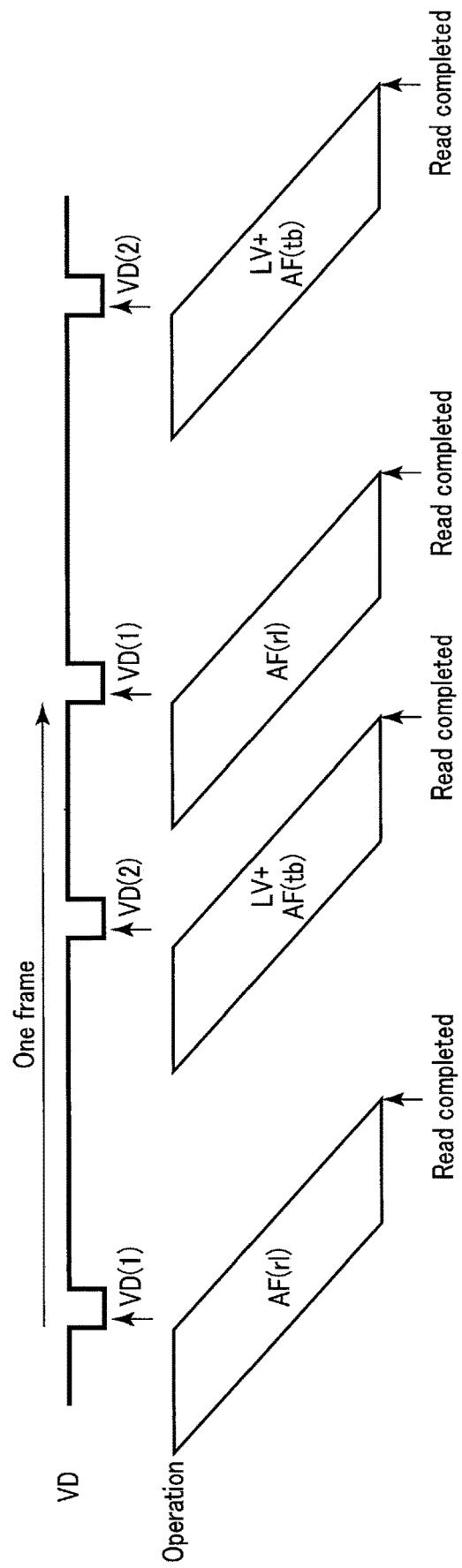
FIG. 6 is a timing chart for explaining imaging and read processing for AF and an LV display in a first embodiment.

Now, the processing in steps S104 and S111 will be explained. FIG. 6 is a timing chart for explaining imaging and read processing for the AF and LV display in steps S104 and S111. Here, the "VD" in FIG. 6 shows a timing of a synchronization signal (a vertical synchronization signal) that is input to the control circuit 302. VD(1) is a vertical synchronization signal showing a timing of a first operation including imaging and reading for the AF, and VD(2) is a vertical synchronization signal showing a timing of a second operation including imaging and reading for the LV display. VD(1) and VD(2) are input to the control circuit 302 once during one frame. In this case, the processing in step S104 is performed for every frame. The length of one frame is decided in accordance with such as an update interval of a screen of the LV display and a continuous shooting speed that indicates a continuous shooting interval upon continuous shooting. Hereinafter, each of the first operation and the second operation will be explained in detail.

First, the first operation will be explained. The first operation indicated by AF(rl) in FIG. 6 is an operation for generating and reading a focus detection pixel signal regarding the first pupil division direction. The first pupil division direction is, for example, a horizontal direction of the pixel portion 303.

Prior to the first operation, the control circuit 302 switches the setting of the pixel portion 303 so that the left-opening pixel signals l (Rl, Grl, Gbl, Bl) and the right-opening pixel signals r (Rr, Grr, Gbr, Br) are output from the pixel portion 303. The control circuit 302 also sets the pixel addition between the pixel portions 303 in order to shorten a read time of the pixel signals. FIG. 7 shows an example of a setting of the pixel addition in the first operation. As shown in FIG. 7, in the first operation, adding is not performed for the horizontal direction, which is the first pupil division direction; however, it is performed only for the vertical direction, which is the second pupil division direction. In the example of FIG. 7, six of each of the pixel signals of the same opening (left-openings or right-openings) aligned in the vertical direction are added. The number of pixel signals to be added is set appropriately in accordance with, for example, a frame rate.

The setting in FIG. 7 compresses the number of lines of the pixel signals to 1/6. By reducing the number of lines of the pixel signals, the read time of the pixel signals is shortened. On the other hand, since the number of columns of the pixel signals is unchanged, a detection accuracy of the phase difference in the horizontal direction is secured.

After the setting in the manner shown in FIG. 7, the CPU 212 outputs a control signal for the imaging element 208 to perform imaging at an exposure time necessary for generating the focus detection pixel signal. The exposure time is set based on subject luminance, etc.

The control circuit 302 receives the input of the control signal from the CPU 212, and starts imaging (accumulation of an electric charge) to be performed for each line of the pixel portion 303. The control circuit 302 controls the vertical scanning circuit 304, and outputs the pixel signals in sequence from the pixel portion 303 of a line in which the imaging is completed. Here, the detection of the phase difference in the horizontal direction is performed by using, for example, a pair of the left-opening pixel signal Grl and the right-opening pixel signal Grr of Gr, and a pair of the left-opening pixel signal Gbl and the right-opening pixel signal Gbr of Gb. That is, a pair of the left-opening pixel signal Rl and the right-opening pixel signal Rr of R, and a pair of the left-opening pixel signal Bl and the right-opening pixel signal Br of B need not necessarily be read. Accordingly, upon reading, in the manner shown in FIG. 8, only the pair of the left-opening pixel signal Grl and the right-opening pixel signal Grr, and the pair of the left-opening pixel signal Gbl and the right-opening pixel signal Gbr may be read. Of course, also the pair of the left-opening pixel signal Rl and the right-opening pixel signal Rr, and the pair of the left-opening pixel signal Bl and the right-opening pixel signal Br may be read together.

Analog processing is applied by the analog processor 305 to the pixel signals read from the pixel portion 303. The analog processed pixel signals are converted into pixel data, which is a digital signal, at the ADC processing circuit 306. The pixel data is stored in the memory circuit 307. As mentioned above, the adding shown in FIG. 7 may also be performed at the memory circuit 307.

The horizontal scanning circuit 308 receives the control signal from the control circuit 302, and transfers the pixel data that is stored in the memory circuit 307 to the output circuit 309 in a column order. The output circuit 309 arrays the pixel data transferred by the horizontal scanning circuit 308, generates a pixel data string, converts the generated pixel data string into a predetermined output signal format of such as a serial signal and a differential signal, and outputs it. This pixel data string is stored in the DRAM 226 in the manner shown, for example, in FIG. 8. In this manner, the first operation is completed.

The pixel data string that is stored in the DRAM 226 by the first operation is used for a correlation calculation to calculate a focus deviation amount. The focus detection circuit 218 performs the correlation calculation by using the pair of the left-opening pixel data Grl and the right-opening pixel data Grr, and the pair of the left-opening pixel data Gbl and the right-opening pixel data Gbr stored in the DRAM 226.

Figures 9, 10:
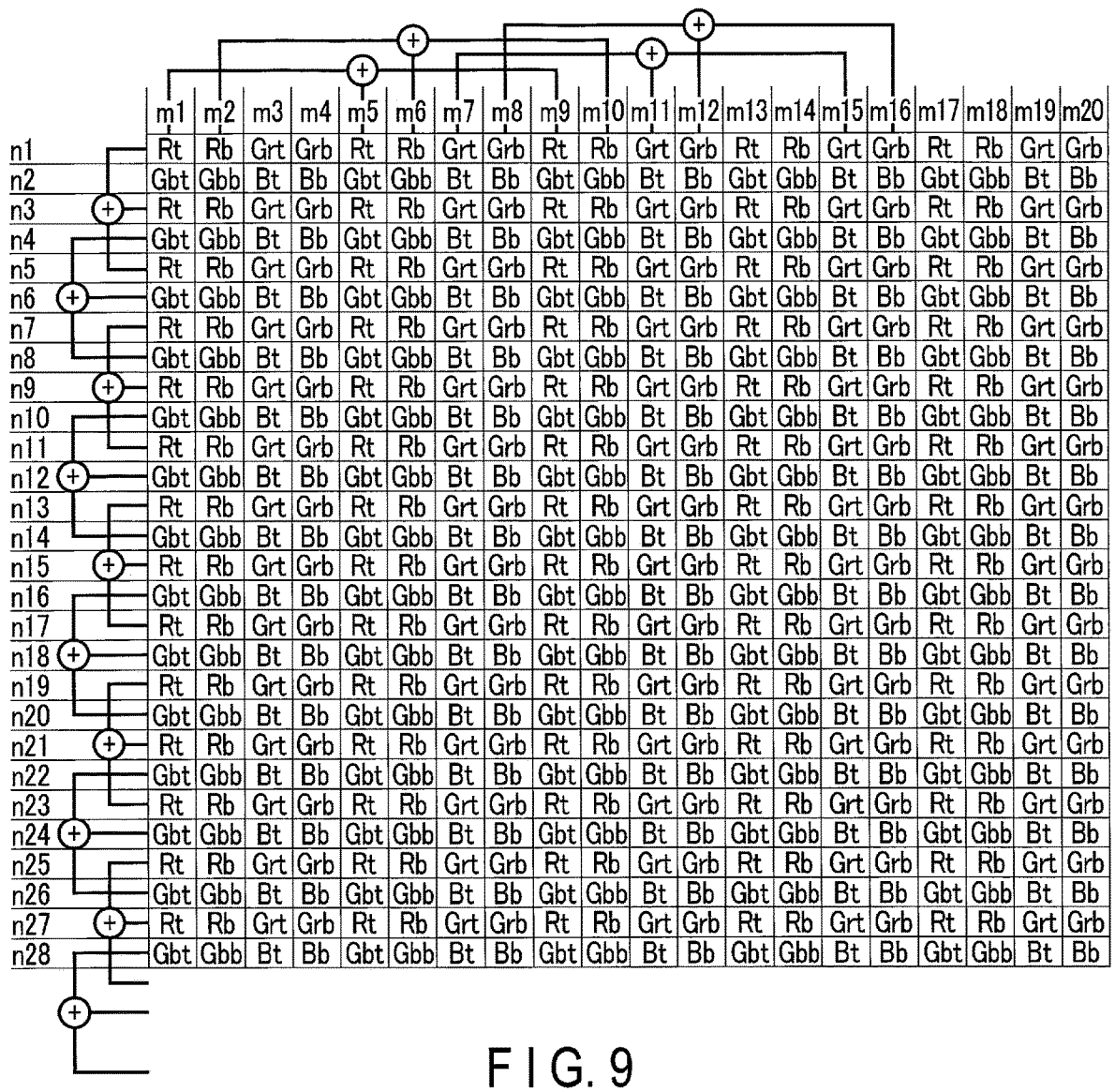
FIG. 9 shows an example of a pixel addition setting in a second operation.
FIG. 10 shows pixel data stored in DRAM by the second operation.

Now, the second operation will be explained. The second operation indicated by LV+AF(tb) in FIG. 6 is an operation mainly focused on generating and reading (LV) a display pixel signal. However, in the present embodiment, the focus detection pixel signal regarding the second pupil division direction will be generated and read (AF(tb)) in the second operation. Prior to the second operation, the control circuit 302 switches the setting of the pixel portion 303 so that the top-opening pixel signals t (Rt, Grt, Gbt, Bt) and the bottom-opening pixel signals b (Rb, Grb, Gbb, Bb) are output from the pixel portion 303. The control circuit 302 also sets the pixel addition between the pixel portions 303 in order to shorten a read time of the pixel signals. FIG. 9 shows an example of a pixel addition setting in the second operation. As shown in FIG. 9, in the second operation, adding is performed in both the horizontal direction (which is the first pupil division direction), and the vertical direction (which is the second pupil division direction). In the example of FIG. 9, three pixel signals aligned in the horizontal direction of the same opening among the top openings or the bottom openings are added, and three pixel signals aligned in the vertical direction of the same opening among the top openings or the bottom openings are added. In the example of FIG. 9, the second line and the third and the fourth columns are set so as not to be added. The surplus occurs merely because the number of lines and the number of columns of the pixel portion 303 are not multiples of three.

The setting in FIG. 9 compresses the number of lines and the number of columns of the pixel signals to 1/3. By reducing the number of lines and the number of columns of the pixel signals, the read time of the pixel signals is shortened. The number of pixel signals to be added is not limited to the above. However, in the second operation, as the number of pixel signals to be added increases, an image quality upon display deteriorates. Furthermore, as the number of pixel signals to be added increases in the vertical direction, a detection accuracy of the phase difference in the vertical direction drops. Accordingly, it is desirable to decide the number of pixel signals to be added appropriately by a trade-off between the read time, and the image quality upon display and the detection accuracy of the phase difference in the vertical direction.

After the setting in the manner shown in FIG. 9, the CPU 212 outputs a control signal for the imaging element 208 to perform imaging at an exposure time that is necessary for generating the focus detection pixel signal. The exposure time is set based on subject luminance, etc.

The control circuit 302 receives the input of the control signal from the CPU 212, and starts the imaging (accumulation of an electric charge) to be performed for each line of the pixel portion 303. The control circuit 302 controls the vertical scanning circuit 304, and outputs the pixel signals in sequence from the pixel portion 303 of a line in which the imaging is completed.

Analog processing is applied by the analog processor 305 to the pixel signals read from the pixel portions 303. The analog-processed pixel signals are converted into pixel data, which is a digital signal, at the ADC processing circuit 306. The pixel data is stored in the memory circuit 307. In the second operation, pixel signals of R, Gr, Gb, and B are necessary for the display image data. Therefore, in the memory circuit 307, each of the top-opening pixel signals Rt, Grt, Gbt, and Bt and the bottom-opening pixel signals Rb, Grb, Gbb, and Bb is stored without thinning.

The horizontal scanning circuit 308 receives the control signal from the control circuit 302, and transfers the pixel data that is stored in the memory circuit 307 to the output circuit 309 in a column order. The output circuit 309 arrays the pixel data transferred by the horizontal scanning circuit 308, generates a pixel data string, converts the generated pixel data string into a predetermined output signal format of such as a serial signal and a differential signal, and outputs it. This pixel data string is stored in the DRAM 226 in the manner shown, for example, in FIG. 10. In this manner, the second operation is completed.

The pixel data string that is stored in the DRAM 226 by the second operation is used for the LV display. As mentioned above, the display image data is obtained by calculating arithmetic means of the pixel data of the light-receiving portions lt, rt, lb, and rb that belong to the same pixel portion 303. Accordingly, the image processor 214 generates the display image data by calculating arithmetic means of the top-opening pixel data t (Rt, Grt, Gbt, Bt) and the bottom-opening pixel data b (Rb, Grb, Gbb, Bb).

Furthermore, the pixel data string stored in the DRAM 226 by the second operation is used for a correlation calculation to calculate a focus deviation amount. The focus detection circuit 218 performs the correlation calculation by using a pair of the top-opening pixel data Grt and the bottom-opening pixel data Grb stored in the DRAM 226. Furthermore, the focus detection circuit 218 performs the correlation calculation by using a pair of the top-opening pixel data Gbt and the bottom-opening pixel data Gbb stored in the DRAM 226. That is, the top and bottom-opening pixel data Grt, Grb, Gbt, and Gbb is read from the DRAM 226 twice.

As explained above, in the first embodiment, the pixel signals are read so that the focus detection pixel data regarding the first pupil division direction is generated in the first operation for phase difference AF. Furthermore, the pixel signals are read so that the display pixel data read in the second operation for the LV display can also be used as the focus detection pixel data regarding the second pupil division direction. That is, in the present embodiment, the top and bottom-opening pixel signals are output from the pixel portion so that a phase difference regarding the second pupil division direction can be detected. The top and bottom-opening pixel signals are used to generate the display pixel data for the LV display and the focus detection pixel data for the AF regarding the second pupil division direction. In this manner, while shortening the read time of the pixel signals, the phase difference detection regarding the first pupil division direction and the phase difference detection regarding the second pupil division direction can both be performed. Therefore, in the present embodiment, while securing the focus detection performance of the phase difference system, a time for the live view display can also be secured.

Furthermore, in the present embodiment, by adding the pixel signals of the same opening and reading them, the read time of the pixel signals can be further shortened. Here, in the first operation, the phase difference detection performance in the horizontal direction can be secured by not adding the pixel signals of the same opening regarding the first pupil division direction. Furthermore, in the second operation, both the read time and the phase difference detection performance in the vertical direction can be secured by reducing the number of pixel signals of the same opening to be added regarding the second pupil division direction.

Modified Example 1

Figure 11:
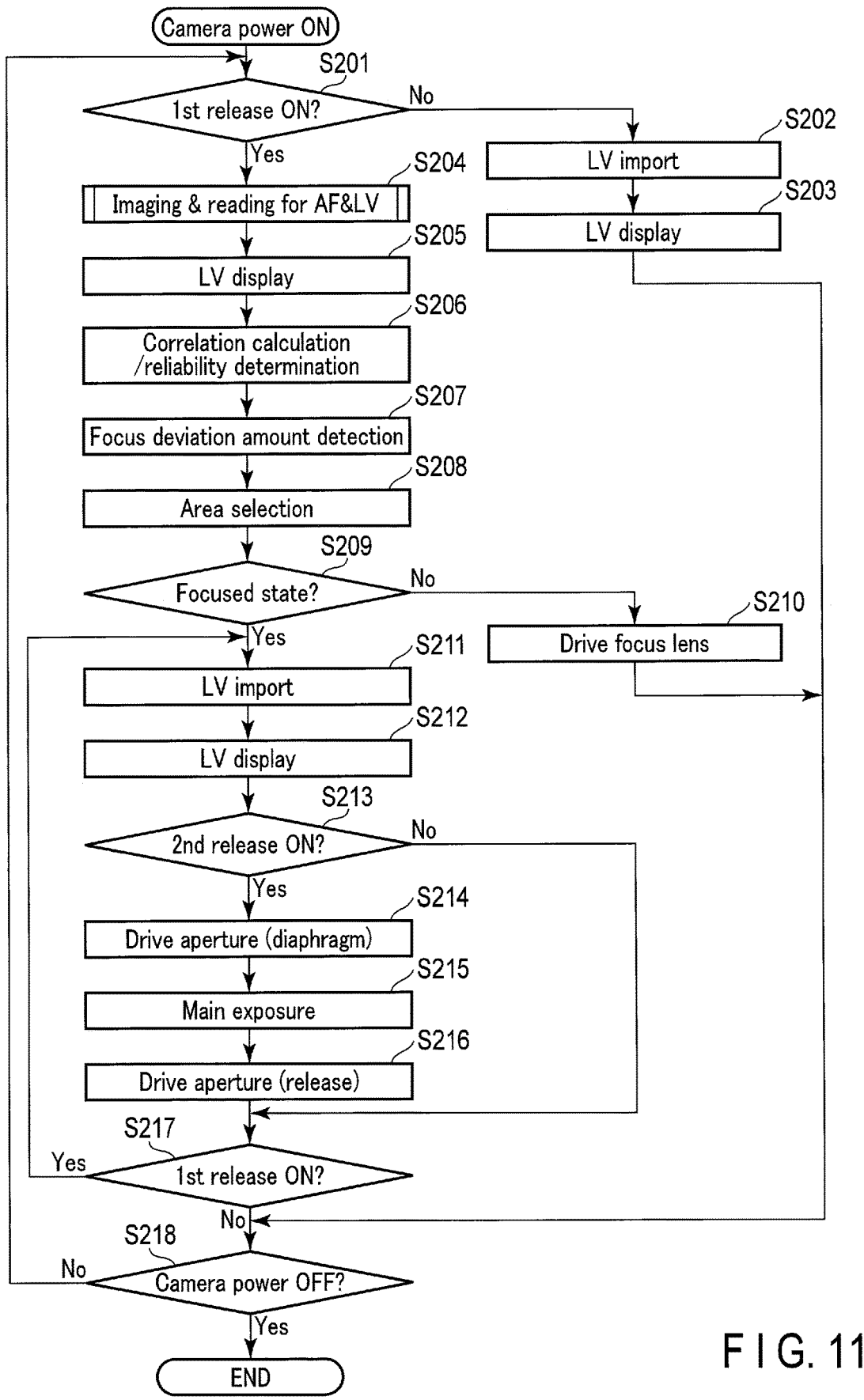
FIG. 11 is a flowchart showing an operation of the imaging device when an AF mode is a single AF mode.

In the following, a modified example of the first embodiment will be explained. The example in FIG. 5A and FIG. 5B shows an operation of when an AF mode of an imaging device is a continuous AF mode. Even when the AF mode of the imaging device is not the continuous AF mode, the technique of the present embodiment mentioned above may be applied when the LV display and the AF are repeated in a short term. For example, the technique of the present embodiment may be applied even when the AF mode of the imaging device is a single AF mode. The single AF mode is an AF mode that, after a first release switch is turned on, performs AF until a subject is focused, and, after the subject is focused, stops the AF operation. FIG. 11 is a flowchart showing an operation of an imaging device 1 when an AF mode is the single AF mode. In FIG. 11, explanations of the portions that overlap with FIG. 5A and FIG. 5B will be omitted as appropriate.

The operation in FIG. 11 is started when a power-ON operation of the imaging device 1 by a user is detected. When the power-ON operation is detected, in step S201, a CPU 212 determines whether or not a first release switch of a release button is in an ON-state. In step S201, when the first release switch is determined as being in an ON-state, the processing proceeds to step S204. In step S201, when the first release switch is determined as not being in an ON-state, the processing proceeds to step S202.

In step S202, the CPU 212 imports display pixel data for a live view (LV) display. In step S203, the CPU 212 performs the LV display. Subsequently, the processing proceeds to step S218.

In step S204, the CPU 212 performs imaging and reading for AF and the LV display. The processing in step S204 is performed in the same manner as the embodiment mentioned above. In step S205, the CPU 212 performs the LV display.

In step S206, the CPU 212 executes a focus detection calculation by a focus detection circuit 218. The focus detection circuit 218 performs correlation calculation by using focus detection pixel data that forms a pair among the focus detection pixel data stored in a DRAM 226. After the correlation calculation, the focus detection circuit 218 performs reliability determination of the focus detection. In step S207, the focus detection circuit 218 performs a focus deviation amount calculation. In step S208, the focus detection circuit 218 performs area selection processing.

In step S209, the CPU 212 determines whether or not a focus lens 1021 is in a focused state. In step S209, when the focus lens 1021 is determined as not being in the focused state, the processing proceeds to step S210. In step S209, when the focus lens 1021 is determined as being in the focused state, the processing proceeds to step S211.

In step S210, the CPU 212 outputs a control signal to a lens CPU 106 so that the focus lens 1021 is driven in accordance with the focus lens position that is calculated regarding the focus detection region selected in step S208. The lens CPU 106 receives this control signal and drives the focus lens 1021 through a drive unit 104. Subsequently, the processing proceeds to step S218.

In step S211, the CPU 212 imports the display pixel data for the LV display. In step S212, the CPU 212 performs the LV display.

In step S213, the CPU 212 determines whether or not a second release switch has been turned on. In step S213, when the second release switch is determined as not being in an ON-state, the processing proceeds to step S217. In step S213, when the second release switch is determined as being in an ON-state, the processing proceeds to step S214.

In step S214, the CPU 212 instructs the lens CPU 106 to drive an aperture 1022 and starts the operation. Here, an opening amount of the aperture 1022 is an opening amount corresponding to an aperture value which has been calculated based on subject luminance measured by the last photometric calculation.

In step S215, the CPU 212 starts a main exposure. In the main exposure, the CPU 212 controls a drive unit 204 so that a mechanical shutter 202 is opened/closed for only a predetermined exposure period. The CPU 212 starts imaging of an imaging element 208 during the exposure period. After ending the exposure period, a control circuit 302 reads a pixel signal from each light receiving portion of the imaging element 208. After reading the pixel signal, the CPU 212 causes an image processor 214 to perform processing for generating still image data for recording. Thereby, the image processor 214 performs the processing necessary for generating the image data for recording, and generates the still image data for recording. After completing the image processing, the CPU 212 compresses the still image data for recording by an image compression/expansion unit 216. After completing the compression, the CPU 212 records the compressed still image data for recording in a recording medium 230 as an image file.

In step S216, the CPU 212 instructs a lens CPU 106 to open the aperture 1022.

In step S217, the CPU 212 determines whether or not the first release switch is in an ON-state. In step S217, when the first release switch is determined as being in an ON-state, the processing returns to step S211. In step S217, when the first release switch is determined as not being in an ON-state, the processing proceeds to step S218.

In step S218, the CPU 212 determines whether or not to turn off the power of the camera body 200. In step S218, when the power of the camera body 200 is determined not to be turned off, the processing returns to step S201. In step S218, when the power of the camera body 200 is determined to be turned off, the processing ends.

Therefore, in the single AF mode, the LV display and the AF are repeated from when the first release switch is turned on until the subject is focused. Accordingly, the technique of the present embodiment is effective.

Modified Example 2

In the second operation mentioned above, the display image data is generated by calculating arithmetic mean the top and bottom-opening pixel data t and b that is read from the light-receiving portions lt, rt, lb, and rb belonging to the same pixel portion 303 that is stored in the DRAM 226. This is to allow the top and bottom-opening pixel data t and b that is stored in the DRAM 226 to be read as focus detection pixel data regarding the second pupil division direction.

In contrast, in the manner shown in FIG. 12, for example, an imaging element 208 may be configured to output, from a pixel portion 303, pixel signals obtained by adding the top and bottom-opening pixel signals t and b that are unnecessary for detecting a phase difference regarding a second pupil division direction, such as the pixel signals joined by "+" in FIG. 12, and to output the top and bottom-opening pixel signals t and b necessary for detecting the phase difference regarding the second pupil division direction, such as the pixel signals not joined by "+" in FIG. 12, without adding them. In this case, the pixel data will be stored in the DRAM 226 in the manner shown in FIG. 13. In this manner, by adding what can be added in the pixel portion 303 in advance, the amount of pixel data to be stored in the DRAM 226 can be reduced. Furthermore, arithmetic mean processing for generating the display image data can also be omitted in the image processor 214. On the other hand, the phase difference regarding the second pupil division direction can be performed appropriately.

Modified Example 3

Figure 14B:
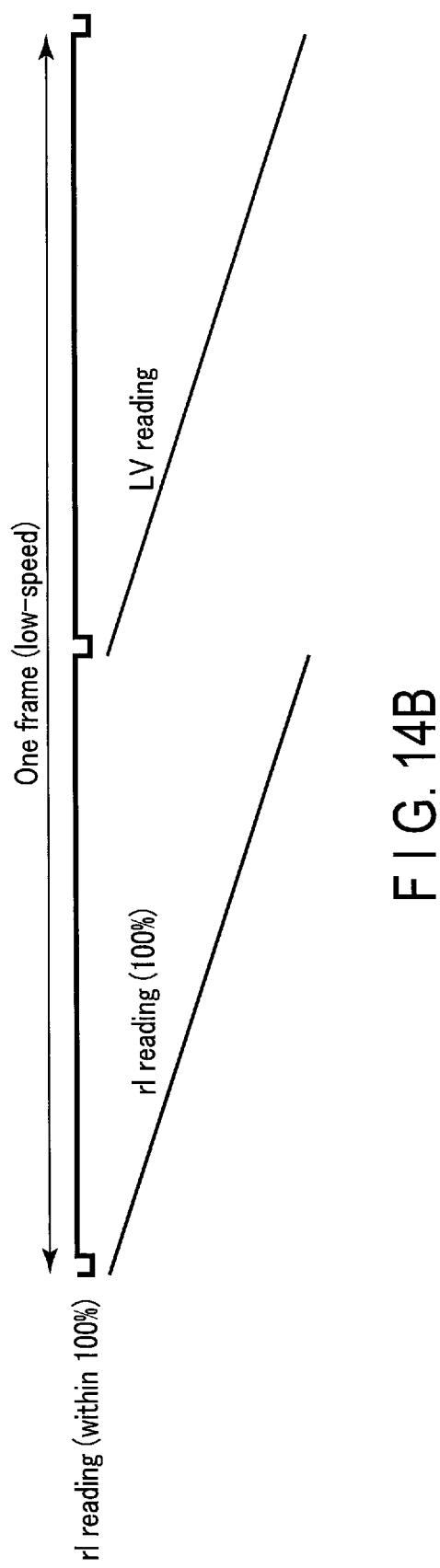
FIG. 14B is a diagram used to explain a third modified example in the first embodiment.

In the first operation, the read time is to be shortened by adding the pixel signals of the same opening that are aligned in the vertical direction, which is the second pupil division direction, before outputting them from the pixel portion 303. In contrast, the read time can also be shortened by thinning and reading the pixel signals. For example, processing can be carried out in a manner that, when a frame rate set in accordance with a continuous shooting speed, etc. is faster than a predetermined value, pixel signals for only 50% of the lines are read as shown in FIG. 14A. Alternatively, when the frame rate is slower than the predetermined value, pixel signals for 100% of the lines are read as shown in FIG. 14B. Pixel addition reading and thinning reading may be used in parallel. Furthermore, in a case where it is difficult to maintain a frame rate only by the thinning reading with respect to the first operation, etc., the thinning reading may be performed also in the second operation.

Other Modified Examples

In the embodiment mentioned above, the first pupil division direction is a horizontal direction, and the second pupil division direction is a vertical direction. Instead, the first pupil division direction may be the vertical direction, and the second pupil division direction may be the horizontal direction. In this case, in the first operation, the pixel portion 303 is set to output the top and bottom-opening pixel signals, and, in the second operation, the pixel portion 303 is set to output the left and right-opening pixel signals.

Furthermore, in the embodiment mentioned above, the pixel addition, etc. in the pixel portion 303 is set by the control circuit 302 provided inside the imaging element 208. The control circuit 302 may also be provided outside the imaging element 208. In this case, the CPU 212 may, for example, be configured to be able to execute the same processing as the control circuit 302.

Second Embodiment

A second embodiment will be explained. In the second embodiment, processing in step S104 and step S111 differ from the first embodiment. Other configurations and operations are the same between the first embodiment and the second embodiment. Therefore, explanations thereof will be omitted.

Figure 15:
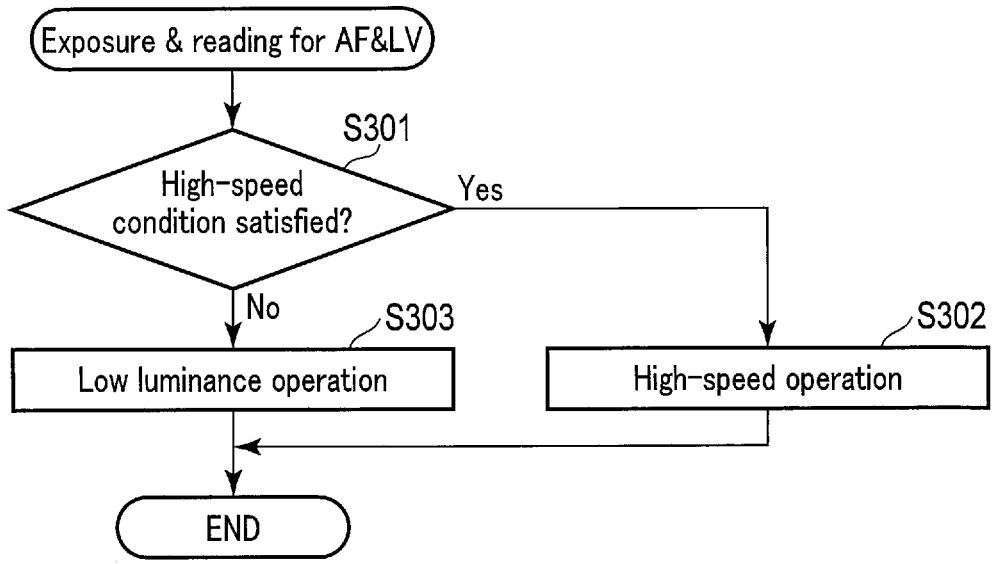
FIG. 15 is a flowchart showing imaging and read processing for AF and an LV display in a second embodiment.

FIG. 15 is a flowchart showing imaging and read processing for AF and an LV display of step S104 and step S111 in the second embodiment. In the present embodiment, different imaging and reading are performed depending on whether the case involves a pixel signal needing to be read at high speed, or whether it involves focus detection performance being considered more important than reading the pixel signal at high speed.

In step S301, a control circuit 302 determines whether or not a high-speed read condition is satisfied. The determination on whether or not the high-speed read condition is satisfied is based on information sent from, for example, a CPU 212. This information includes a setting of continuous shooting speed, an aperture value, subject luminance, and a history of focusing result. For example, the high-speed read condition is determined as being satisfied when all of the following conditions (1) to (3) are satisfied, or condition (4) is satisfied. In step S301, when the high-speed read condition is determined as being satisfied, the processing proceeds to step S302. In step S301, when the high-speed read condition is determined as not being satisfied, the processing proceeds to step S303.

(1) The continuous shooting speed (frame rate) is equal to or greater than a predetermined value.

(2) The aperture value (F-number) is equal to or lower than a predetermined value.

(3) The subject luminance is equal to or greater than a predetermined value.

(4) A focus deviation amount cannot be detected continuously over a predetermined number of times. The continuous shooting speed, which is a condition of (1), corresponds to an interval of continuous shooting. In the case where a frame rate of a main exposure is high, that is, the interval of the continuous shooting is short, it is preferable to shorten a time necessary for the AF by performing high-speed reading while shortening an exposure time for the AF. The aperture value, which is a condition of (2), is expressed by, for example, an F-number. If the aperture value is equal to or lower than a predetermined value, a bright image may be easily acquired. Therefore, even if the exposure time for the AF is shortened, the focus detection performance may be secured. If the subject luminance is equal to or greater than a predetermined value, which is a condition of (3), a bright image may be easily acquired. Therefore, even if the exposure time for the AF is shortened, the focus detection performance may be secured. Regarding the subject luminance, it is necessary to determine whether or not at least the subject luminance in a focus detection region selected by area selection processing is equal to or greater than a predetermined value. The subject luminance in an entire focus detection region may be determined as equal to or greater than a predetermined value, or the subject luminance in a focus detection region around an area including the focus detection region selected by the area selection processing may be determined as equal to or greater than a predetermined value. Regarding the determination on whether or not the focus deviation amount has been able to be detected, which is a condition of (4), the detection of the focus deviation amount is determined to have failed when lack of reliability is determined, such as in a case where a contrast of a subject in each focus detection region is low, or in a case where a minimal value of a correlation value is large.

In step S302, which is a result of when the high-speed read condition is determined as having been satisfied in step S301, the control circuit 302 performs the high-speed operation. After ending the high-speed operation, the processing is ended.

Hereinafter, the high-speed operation will be explained. FIG. 16 is a timing chart for explaining the high-speed operation. Here, "VD" in FIG. 16 shows a timing of a synchronization signal (a vertical synchronization signal) that is input to the control circuit 302. VD(1) is a vertical synchronization signal showing a timing of a first operation including imaging and reading for the AF, and VD(2) is a vertical synchronization signal showing a timing of the second operation including the imaging and reading for the LV display. In the high-speed operation, the first operation and the second operation are performed alternately in accordance with the input of the vertical synchronization signal. The first operation and the second operation are performed once, respectively, during a single frame. In this case, the processing in step S104 and step S111 is performed for every frame. The length of one frame is decided in accordance with such as an update interval of a screen of the LV display and a continuous shooting speed that indicates a continuous shooting interval upon continuous shooting. Hereinafter, both the first operation and the second operation in the high-speed operation will be explained in detail.

First, the first operation in the high-speed operation will be explained. The first operation indicated by AF(rl) in FIG. 16 is an operation for generating and reading a focus detection pixel signal regarding the first pupil division direction. The first pupil division direction is, for example, a horizontal direction of a pixel portion 303. Prior to the first operation, the control circuit 302 switches the setting of the pixel portion 303 so that left-opening pixel signals l (Rl, Grl, Gbl, Bl) and right-opening pixel signals r (Rr, Grr, Gbr, Br) are output from the pixel portion 303. The control circuit 302 also sets the pixel addition between the pixel portions 303 in order to shorten a read time of the pixel signals and to improve. S/N.

Here, the setting of the pixel addition will be explained. In the following explanation, the setting of the pixel addition in the pixel portion 303 will be expressed by adding "H" (expressing a horizontal direction) or "V" (expressing a vertical direction) to n/m. Here, n is the number of pixel signals used for adding. Furthermore, m is the number of pixel signals to be the target for adding. For example, the case of V1/9 pixel addition shows that one out of nine pixel signals of the same opening aligned in the vertical direction is added. That is, only one in nine pixel signals is read, and the rest of the eight pixel signals are thinned. Furthermore, in the case of V5/9 pixel addition, it shows that five in nine pixel signals of the same opening aligned in the vertical direction are added and read, and the rest of the four pixel signals are thinned. In the case of H1/1 pixel addition, it shows that a pixel signal is read without performing adding or thinning in the horizontal direction.

FIG. 17 shows an example of a setting of the pixel addition of the first operation in the high-speed operation. In the first operation shown in FIG. 17, adding is not performed for the horizontal direction, which is the first pupil division direction; however, it is performed only for the vertical direction, which is the second pupil division direction. In the example of FIG. 17, pixel signals of the left-openings or the right-openings, which are of the same openings, are set to perform 1/1 pixel addition for the horizontal direction, that is, not to perform addition; and pixel signals of the left-openings or the right-openings, which are of the same openings, are set to perform 5/9 pixel addition for the vertical direction. The number of pixel signals to be added is set as appropriate in accordance with, for example, a frame rate.

The setting in FIG. 17 compresses the number of lines of the pixel signals. By reducing the number of lines of the pixel signals, the read time of the pixel signals is shortened. On the other hand, since the number of columns of the pixel signals is unchanged, a detection accuracy of a phase difference in the horizontal direction can be secured. Furthermore, as will be explained later on, in the second operation in the high-speed operation, the focus detection pixel signal regarding the second pupil division direction is not generated and read in order to secure display quality level upon display. Therefore, in the high-speed operation, focus detection with respect to a subject is performed only by the focus detection pixel signal obtained in the first operation. Here, in the first operation in the high-speed operation, the number of additions in the vertical direction is suppressed to five pixels or lower. By suppressing the number of additions in the vertical direction in this manner, information of the phase difference in the vertical direction will remain in the pixel signal. The focus detection pixel signal which is generated based on such a pixel signal would have information of the phase difference in a substantially diagonal direction. In the example of FIG. 17, five pixel signals are to be added for the vertical direction. The number of additions in the vertical direction should be equal to or less than five pixels.

After the setting in the manner shown in FIG. 17, the CPU 212 outputs a control signal for the imaging element 208 to perform imaging at an exposure time that is necessary for generating the focus detection pixel signal. The exposure time is set based on subject luminance, etc.

The control circuit 302 receives the input of the control signal from the CPU 212 and starts the imaging (accumulation of an electric charge) to be performed for each line of the pixel portion 303. The control circuit 302 controls a vertical scanning circuit 304, and outputs the pixel signals in sequence from the pixel portion 303 of a line in which the imaging is completed.

Here, the detection of the phase difference in the horizontal direction is performed by using, for example, a pair of the left-opening pixel signal Grl and the right-opening pixel signal Grr of Gr, and a pair of the left-opening pixel signal Gbl and the right-opening pixel signal Gbr of Gb. That is, a pair of the left-opening pixel signal Rl and the right-opening pixel signal Rr of the R, and a pair of the left-opening pixel signal Bl and the right-opening pixel signal Br of the B need not necessarily be read. Accordingly, upon reading, in the manner shown in FIG. 18, only the pair of the left-opening pixel signal Grl and the right-opening pixel signal Grr, and the pair of the left-opening pixel signal Gbl and the right-opening pixel signal Gbr, may be read. Of course, also the pair of the left-opening pixel signal Rl and the right-opening pixel signal Rr, and the pair of the left-opening pixel signal Bl and the right-opening pixel signal Br may be read together.

Analog processing is applied by an analog processor 305 to the pixel signals read from the pixel portion 303. The analog processed pixel signals are converted into pixel data, which is a digital signal, at an ADC processing circuit 306. The pixel data is stored in a memory circuit 307. As mentioned above, the adding shown in FIG. 17 may also be performed at the memory circuit 307.

A horizontal scanning circuit 308 receives the control signal from the control circuit 302, and transfers the pixel data stored in the memory circuit 307 to an output circuit 309 in a column order. The output circuit 309 arrays the pixel data transferred by the horizontal scanning circuit 308, generates a pixel data string, converts the generated pixel data string into a predetermined output signal format such as a serial signal and a differential signal, and outputs it. This pixel data string is stored in a DRAM 226 in the manner shown, for example, in FIG. 18. In this manner, the first operation is completed.

The pixel data string stored in the DRAM 226 by the first operation is used for a correlation calculation to calculate a focus deviation amount. A focus detection circuit 218 performs the correlation calculation by using the pair of the left-opening pixel signal Grl and the right-opening pixel signal Grr, and the pair of the left-opening pixel signal Gbl and the right-opening pixel signal Gbr stored in the DRAM 226.

Now, the second operation in the high-speed operation will be explained. The second operation indicated by LV in FIG. 16 is an operation for generating and reading (LV) a display pixel signal. In the high-speed operation, the generation and reading of the focus detection pixel signal regarding the second pupil division direction, as will be explained later on, will not be performed. Prior to the second operation, the control circuit 302 switches the setting of the pixel portion 303 so that top-opening pixel signals t (Rt, Grt, Gbt, Bt) and bottom-opening pixel signals b (Rb, Grb, Gbb, Bb) are output from the pixel portion 303. The control circuit 302 also sets the pixel addition between the pixel portions 303 in order to shorten a read time of the pixel signals.

FIG. 19 shows an example of a setting of the pixel addition of the second operation in the high-speed operation. In the second operation in the high-speed operation, the pixel signals are used only to generate the display pixel signal. The display image data is obtained by calculating arithmetic mean of the pixel data of the light-receiving portions lt, rt, lb, and rb that belong to the same pixel portion 303. Accordingly, the control circuit 302 sets the pixel portion 303 to add the top and bottom opening pixel signals t and b, which are the pixel signals joined by "+" in the example of FIG. 19, and to output the signal therefrom. The control circuit 302 also sets the pixel addition between the pixel portions 303 in order to shorten a read time of the pixel signals. As shown in FIG. 19, in the second operation of the high-speed operation, adding is performed in both the horizontal direction, which is the first pupil division direction, and the vertical direction, which is the second pupil division direction. In the example of FIG. 19, H3/3 pixel addition is performed for the horizontal direction, and V3/3 pixel addition is performed for the vertical direction.

The setting in FIG. 19 compresses the number of lines and the number of columns of the pixel signals to 1/3. By reducing the number of lines and the number of columns of the pixel signals, the read time of the pixel signals is shortened. The number of pixel signals to be added is not limited to the above. However, in the second operation, as the number of pixel signals to be added increases, an image quality upon display deteriorates. Accordingly, it is desired that the number of pixel signals to be added is decided as appropriate by a trade-off between the image quality upon display and the read time (frame rate). In FIG. 19, the control circuit 302 sets the pixel portion 303 to add the top and bottom opening pixel signals t and b, which are the pixel signals joined by "+" in the example of FIG. 19, and output the signal; however, the control circuit 302 may also set the pixel portion 303 to add the left- and right-opening pixel signals l and r, and output the signal. The control circuit 302 may also set the pixel portion 303 to output a fully open pixel signal, and output a pixel signal obtained by adding the pixel signals joined by "+" in FIG. 19.

After the setting in the manner shown in FIG. 19, the CPU 212 outputs a control signal for the imaging element 208 to perform imaging at an exposure time necessary for generating the display pixel signal. The exposure time is set based on subject luminance, etc.

The control circuit 302 receives the input of the control signal from the CPU 212 and starts imaging (accumulation of an electric charge) to be performed for each line of the pixel portion 303. The control circuit 302 controls the vertical scanning circuit 304, and outputs the pixel signals in sequence from the pixel portion 303 of a line in which the imaging is completed.

Analog processing is applied by an analog processor 305 to the pixel signals read from the pixel portion 303. The analog processed pixel signals are converted into pixel data, which is a digital signal, at the ADC processing circuit 306. The pixel data is stored in the memory circuit 307. In the second operation, pixel signals of R, Gr, Gb, and B would be necessary for the display image data. Therefore, in the memory circuit 307, each of the pixel signal R, an addition signal of the top-opening pixel signal Rt and the bottom-opening pixel signal Rb; the pixel signal Gr, an addition signal of the top-opening pixel signal Grt and the bottom-opening pixel signal Grb; the pixel signal Gb, an addition signal of the top-opening pixel signal Gbt and the bottom-opening pixel signal Gbb; and the pixel signal B, an addition signal of the top-opening pixel signal Bt and the bottom-opening pixel signal Bb is stored without thinning.

The horizontal scanning circuit 308 receives the control signal from the control circuit 302, and transfers the pixel data stored in the memory circuit 307 to the output circuit 309 in a column order. The output circuit 309 arrays the pixel data transferred by the horizontal scanning circuit 308, generates a pixel data string, converts the generated pixel data string into a predetermined output signal format of such as a serial signal and a differential signal, and then outputs it. This pixel data string is stored in the DRAM 226 in the manner shown, for example, in FIG. 20. In this manner, the second operation is completed.

The pixel data string that is stored in the DRAM 226 by the second operation is used for the LV display. An image processor 214 generates the display image data from the pixel data R, Gr, Gb, and B stored in the DRAM 226. In the high-speed operation as mentioned above, the read time can be shortened. Furthermore, in the second operation in the high-speed operation, the focus detection pixel signal is not generated or read. Accordingly, in the second operation, a time used for generating and reading the focus detection pixel signal can be used for generating and reading the display pixel signal. Therefore, a high quality of the display can be maintained while enabling the high-speed operation. On the other hand, by suppressing the number of additions in the vertical direction in the first operation, the focus detection of the subject can be performed with accuracy only by performing the phase difference detection in the horizontal direction.

Here, the explanation returns to FIG. 15. In step S303, which is a result of when the high-speed read condition is determined as not being satisfied in step S301, the control circuit 302 performs a low-luminance operation. After ending the low-luminance operation, the processing is ended.

Hereinafter, the low-luminance operation will be explained. FIG. 21 is a timing chart for explaining the low-luminance operation. Here, "VD" in FIG. 21 shows a timing of a synchronization signal (a vertical synchronization signal) that is input to the control circuit 302 in the same manner as FIG. 16. VD(1) is a vertical synchronization signal showing a timing of the first operation including the imaging and the reading for the AF, and VD(2) is a vertical synchronization signal showing a timing of the second operation including the imaging and the reading for the LV display. Also in the low-luminance operation, the first operation and the second operation are performed alternately in accordance with the input of the vertical synchronization signal. The first operation and the second operation are performed once, respectively, during one frame. In this case, the processing in step S104 and step S111 is performed for every frame. Hereinafter, both the first operation and the second operation in the low-luminance operation will be explained in detail.

First, the first operation in the low-luminance operation will be explained. The first operation indicated by AF(rl) in FIG. 21 is an operation for generating and reading the focus detection pixel signal regarding the first pupil division direction in the same manner as the first operation in the high-speed operation. Prior to the first operation, the control circuit 302 switches the setting of the pixel portion 303 so that left-opening pixel signals l (Rl, Grl, Gbl, Bl) and right-opening pixel signals r (Rr, Grr, Gbr, Br) are output from the pixel portion 303. The control circuit 302 also sets the pixel addition between the pixel portions 303 in order to shorten a read time of the pixel signals.

Figures 22, 23:
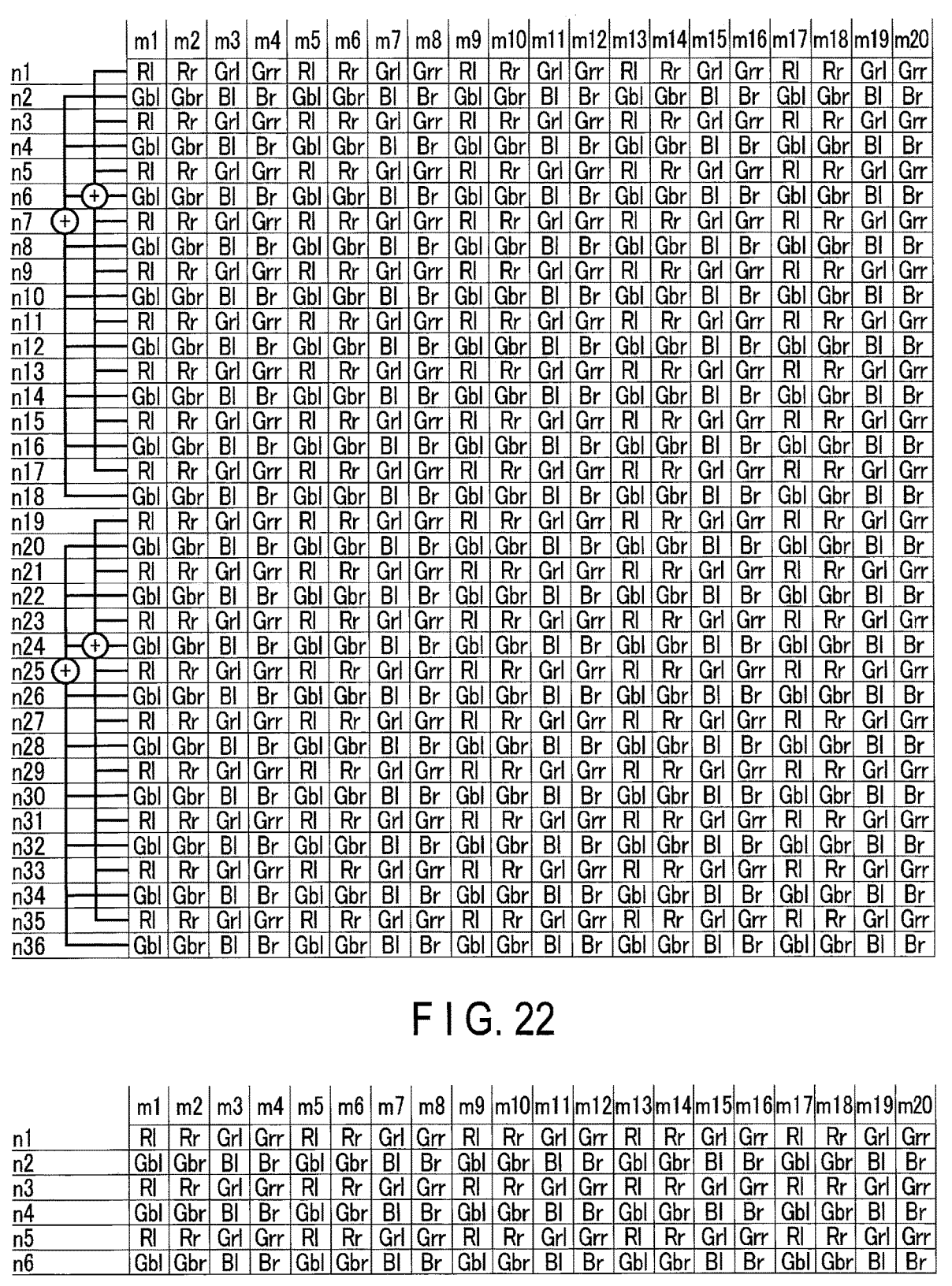

FIG. 22 shows an example of a pixel addition setting of the first operation in the low-luminance operation. As shown in FIG. 22, in the first operation, adding is not performed for the horizontal direction, which is the first pupil division direction; however, it is performed only for the vertical direction, which is the second pupil division direction. In the example of FIG. 22, pixel signals of the left-openings or the right-openings, which are of the same openings, are set to perform H1/1 pixel addition for the horizontal direction, and pixel signals of the left-openings or the right-openings, which are of the same openings, are set to perform V9/9 pixel addition for the vertical direction. The number of pixel signals to be added in the vertical direction is set as appropriate in accordance with, for example, a frame rate.

The setting in FIG. 22 compresses the number of lines of the pixel signals to 1/9. By reducing the number of lines of the pixel signals, the read time of the pixel signals is shortened. On the other hand, since the number of columns of the pixel signals is not changed, a detection accuracy of the phase difference in the horizontal direction is secured. Furthermore, as will be explained later on, in the second operation in the low-luminance operation, the focus detection pixel signal regarding the second pupil division direction is generated and read. Therefore, in the first operation in the low-luminance operation, only the phase difference in the horizontal direction needs to be detected with accuracy. Accordingly, in the first operation in the low-luminance operation, by increasing the number of additions in the vertical direction, improvement in S/N is attempted.

After the setting in the manner shown in FIG. 22, the CPU 212 outputs a control signal for the imaging element 208 to perform imaging at an exposure time necessary for generating the focus detection pixel signal. The exposure time is set based on the subject luminance, etc.

The control circuit 302 receives the input of the control signal from the CPU 212, and starts the imaging (accumulation of an electric charge) to be performed for each line of the pixel portion 303. The control circuit 302 controls the vertical scanning circuit 304, and outputs the pixel signals in sequence from the pixel portion 303 of a line in which the imaging is completed.

Here, the detection of the phase difference in the horizontal direction is performed by using, for example, a pair of the left-opening pixel signal Grl and the right-opening pixel signal Grr of Gr, and a pair of the left-opening pixel signal Gbl and the right-opening pixel signal Gbr of Gb. That is, a pair of the left-opening pixel signal Rl and the right-opening pixel signal Rr of the R, and a pair of the left-opening pixel signal Bl and the right-opening pixel signal Br of the B need not necessarily be read. On the other hand, as shown in FIG. 23, also the pair of the left-opening pixel signal Rl and the right-opening pixel signal Rr, and the pair of the left-opening pixel signal Bl and the right-opening pixel signal Br may be read together.

Analog processing is applied by the analog processor 305 to the pixel signals read from the pixel portion 303. The analog processed pixel signals are converted into pixel data, which is a digital signal, at the ADC processing circuit 306. The pixel data is stored in the memory circuit 307. As mentioned above, the adding shown in FIG. 23 may also be performed at the memory circuit 307. Furthermore, in the first operation of the low-luminance operation, pixel data of the same opening adjacent in the vertical direction read from the imaging element 208 may be added further at, for example, the memory circuit 307. Thereby, further improvement in S/N may be attempted.

The horizontal scanning circuit 308 receives the control signal from the control circuit 302, and transfers the pixel data stored in the memory circuit 307 to the output circuit 309 in a column order. The output circuit 309 arrays the pixel data transferred by the horizontal scanning circuit 308, generates a pixel data string, converts the generated pixel data string into a predetermined output signal format of such as a serial signal and a differential signal, and then outputs it. This pixel data string is stored in the DRAM 226 in the manner shown, for example, in FIG. 23. In this manner, the first operation is completed.

The pixel data string stored in the DRAM 226 by the first operation is used for a correlation calculation to calculate a focus deviation amount. The focus detection circuit 218 performs the correlation calculation by using the pair of the left-opening pixel data Grl and the right-opening pixel data Grr, and the pair of the left-opening pixel data Gbl and the right-opening pixel data Gbr stored in the DRAM 226.

Now, the second operation in the low-luminance operation will be explained. The second operation indicated by LV in FIG. 21 is an operation mainly on generating and reading (LV) a display pixel signal. However, in the present embodiment, the focus detection pixel signal regarding the second pupil division direction will also be generated and read (AF(tb)) in the second operation. Prior to the second operation, the control circuit 302 switches the setting of the pixel portion 303 so that top-opening pixel signals t (Rt, Grt, Gbt, Bt) and bottom-opening pixel signals b (Rb, Grb, Gbb, Bb) are output from the pixel portion 303. The control circuit 302 also sets the pixel addition between the pixel portions 303 in order to shorten a read time of the pixel signals.

Figures 24, 25:
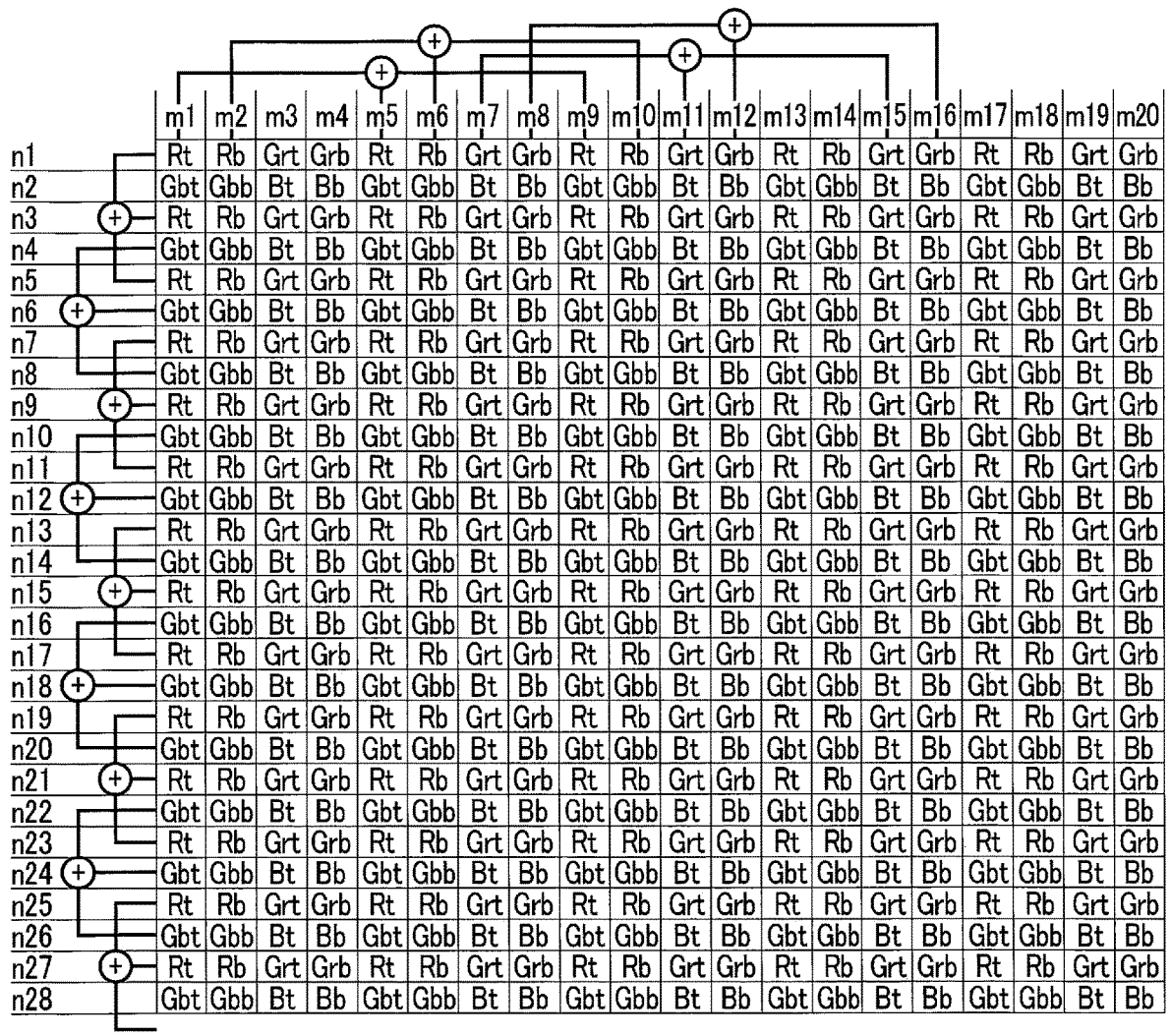
FIG. 24 shows an example of a setting of pixel addition of the second operation in the low-luminance operation.
FIG. 25 shows pixel data stored in DRAM by the second operation in the low-luminance operation.

FIG. 24 shows an example of a pixel addition setting of the second operation in the low-luminance operation. In the second operation, adding is performed in both the horizontal direction, which is the first pupil division direction, and the vertical direction, which is the second pupil division direction. In the example of FIG. 24, H3/3 pixel addition is performed for the horizontal direction, and V3/3 pixel addition is performed for the vertical direction. In the second operation in the low-luminance operation, the pixel addition is desired to be $3 \le n \le 5$, $3 \le m \le 5$, and $n \le m$ regarding the horizontal direction, and $1 \le n \le 3$, $1 \le m \le 3$, and $n \le m$ regarding the vertical direction. In the same manner as in the first operation of the high-speed operation mentioned above, by suppressing the number of pixels to be added to five pixels or less, the detection accuracy of the phase difference in the vertical direction can be secured.

The setting in FIG. 24 compresses the number of lines and the number of columns of the pixel signals to 1/3. By reducing the number of lines and the number of columns of the pixel signals, the read time of the pixel signals is shortened. The number of pixel signals to be added is not limited to the above. However, in the second operation, as the number of pixel signals to be added increases, an image quality upon display deteriorates. Furthermore, as the number of pixel signals to be added increases in the vertical direction, a detection accuracy of the phase difference in the vertical direction drops. Accordingly, it is desirable to decide the number of pixel signals to be added appropriately by a trade-off between the read time, and the image quality upon display and the detection accuracy of the phase difference in the vertical direction.

After the setting in the manner shown in FIG. 24, the CPU 212 outputs a control signal to the imaging element 208 to perform imaging at an exposure time necessary for generating the focus detection pixel signal. The exposure time is set based on subject luminance, etc.

The control circuit 302 receives the input of the control signal from the CPU 212 and starts the imaging (accumulation of an electric charge) to be performed for each line of the pixel portion 303. The control circuit 302 controls the vertical scanning circuit 304, and outputs the pixel signals in sequence from the pixel portion 303 of a line in which the imaging is completed.

Analog processing is applied by the analog processor 305 to the pixel signals read from the pixel portion 303. The analog processed pixel signals are converted into pixel data, which is a digital signal, at the ADC processing circuit 306. The pixel data is stored in the memory circuit 307. In the second operation, pixel signals of R, Gr, Gb, and B would be necessary for the display image data. Therefore, in the memory circuit 307, each of the top-opening pixel signals Rt, Grt, Gbt, and Bt and the bottom-opening pixel signals Rb, Grb, Gbb, and Bb is stored without thinning.

The horizontal scanning circuit 308 receives the control signal from the control circuit 302, and transfers the pixel data that is stored in the memory circuit 307 to the output circuit 309 in a column order. The output circuit 309 arrays the pixel data transferred by the horizontal scanning circuit 308, generates a pixel data string, converts the generated pixel data string into a predetermined output signal format of such as a serial signal and a differential signal, and outputs it. This pixel data string is stored in the DRAM 226 in the manner shown, for example, in FIG. 25. In this manner, the second operation is completed.

The pixel data string that is stored in the DRAM 226 by the second operation is used for the LV display. As mentioned above, the display image data is obtained by calculating arithmetic mean of the pixel data of the light-receiving portions lt, rt, lb, and rb that belong to the same pixel portion 303. Accordingly, the image processor 214 generates the display pixel data by calculating arithmetic mean of the top-opening pixel data t (Rt, Grt, Gbt, Bt) and the bottom-opening pixel data b (Rb, Grb, Gbb, Bb).

Furthermore, the pixel data string stored in the DRAM 226 by the second operation is used for a correlation calculation to calculate a focus deviation amount. The focus detection circuit 218 performs the correlation calculation by using a pair of the top-opening pixel data Grt and the bottom-opening pixel data Grb stored in the DRAM 226. Furthermore, the focus detection circuit 218 performs the correlation calculation by using a pair of the top-opening pixel data Gbt and the bottom-opening pixel data Gbb stored in the DRAM 226. That is, the top and bottom-opening pixel data Grt, Grb, Gbt, and Gbb is read from the DRAM 226 twice.

In the low-luminance operation mentioned above, the phase difference detection can be performed in both the horizontal direction and the vertical direction. Therefore, in the first operation, by increasing the number of additions in the vertical direction, the detection accuracy of the phase difference in the horizontal direction can be secured even under low-luminance. Furthermore, in the second operation, the detection accuracy of the phase difference in the vertical direction can be secured while securing a read time of the pixel signals for display.

In the manner explained above, in the second embodiment, the first operation in the case where the high-speed operation is required is capable of securing a focus detection performance regarding the first pupil division direction by adding only the pixel signals regarding the second pupil division direction, and without adding the pixel signals regarding the first pupil division direction. Furthermore, by suppressing the number of pixel signals to be added regarding the second pupil division direction equal to or smaller than the number of predetermined pixels, a focus detection in an oblique direction substantially including a focus detection regarding the second pupil division direction can be performed in the first operation. In addition, by not generating and reading the pixel signals for focus detection, the time for the live view display can be secured in the second operation.

Furthermore, in the first operation where the focus detection performance is required in low-luminance, by setting the number of pixel signals to be added as appropriate only in regard to the second pupil division direction, and without adding the pixel signals in regard to the first pupil division direction, the focus detection performance regarding the first pupil division direction can be secured. Furthermore, in the second operation, by suppressing the number of pixel signals to be added in regard to the second pupil division direction equal to or less than a predetermined number of pixel signals, the focus detection performance in regard to the second pupil division direction can be secured while time for the live view display is also secured.

Therefore, in the present embodiment, the time for live view display can be secured while also securing the focus detection performance of the phase difference system during continuous shooting.

Modified Examples

In the second embodiment mentioned above, the first pupil division direction is a horizontal direction, and the second pupil division direction is a vertical direction. Instead, the first pupil division direction may be the vertical direction, and the second pupil division direction may be the horizontal direction. In this case, in the first operation, the pixel portion 303 is set to output the top and bottom-opening pixel signals, and, in the second operation, the pixel portion 303 is set to output the left and right-opening pixel signals.

Furthermore, in the embodiment mentioned above, the pixel addition, etc. in the pixel portion 303 is set by the control circuit 302 provided inside the imaging element 208. The control circuit 302 may also be provided outside the imaging element 208. In this case, the CPU 212 may, for example, be configured to be able to execute the same processing as the control circuit 302.

Furthermore, in the first operation mentioned above, the read time is to be shortened by adding the pixel signals of the same opening that are aligned in the vertical direction (which is the second pupil division direction) and then outputting them from the pixel portion 303. In contrast, the read time can also be shortened by thinning and reading the pixel signals.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A focus detection device comprising:
    an imaging unit including one or more pixel portions in which a plurality of light-receiving portions are arranged, the light-receiving portions being divided into a first pupil division direction and a second pupil division direction that differs from the first pupil division direction, to perform photoelectric conversion on each light flux that passes through an exit pupil region having different imaging optical systems with respect to one microlens, and to generate pixel signals;
    an image processor configured to perform processing to display an image based on a display pixel signal for display that is generated based on the pixel signals;
    a focus detection circuit configured to perform processing for focus detection based on a focus detection pixel signal for focus detection that is generated based on the pixel signals; and
    a control circuit configured to control the imaging unit to alternately perform a first operation and a second operation that each includes generating and reading the pixel signals, the control circuit controlling the imaging unit to generate the focus detection pixel signal regarding the first pupil division direction in the first operation, and controlling the imaging unit to generate the display pixel signal and the focus detection pixel signal regarding the second pupil division direction in the second operation.

2. The focus detection device according to claim 1, wherein the control circuit controls the imaging unit to add the pixel signals from the light-receiving portions divided in the second pupil division direction in the first operation, and to add the pixel signals from the light-receiving portions divided in the first pupil division direction in the second operation.

3. The focus detection device according to claim 1, wherein the control circuit controls the imaging unit not to add the pixel signals output from the pixel portions regarding the first pupil division direction, and to add the pixel signals regarding the second pupil division direction in the first operation.

4. The focus detection device according to claim 1, wherein the control circuit controls the imaging unit to add the pixel signals output from the pixel portions regarding both the first pupil division direction and the second pupil division direction in the second operation.

5. The focus detection device according to claim 1, wherein the control circuit controls the imaging unit to read only a part of the pixel signals regarding the second pupil division direction in the first operation.

6. The focus detection device according to claim 5, wherein the control circuit controls the imaging unit to read only a part of the pixel signals regarding the second pupil division direction when a frame rate relating to the first operation is faster than a predetermined value.

7. A focus detection method using an imaging unit including one or more pixel portions in which a plurality of light-receiving portions are arranged, the light-receiving portions being divided into a first pupil division direction and a second pupil division direction that differs from the first pupil division direction, to perform photoelectric conversion on each light flux that passes through an exit pupil region having different imaging optical systems with respect to one microlens, and to generate pixel signals, the focus detection method comprising:
performing processing to display an image based on a display pixel signal for display that is generated based on the pixel signals;
performing processing for focus detection based on a focus detection pixel signal for focus detection that is generated based on the pixel signals; and
controlling the imaging unit to alternately perform a first operation and a second operation that each includes generating and reading the pixel signals, the controlling of the imaging unit includes controlling the imaging unit to generate the focus detection pixel signal regarding the first pupil division direction in the first operation, and controlling the imaging unit to generate the display pixel signal and the focus detection pixel signal regarding the second pupil division direction in the second operation.

8. The focus detection method according to claim 7, wherein the controlling of the imaging unit includes controlling the imaging unit to add the pixel signals from the light-receiving portions divided in the second pupil division direction in the first operation, and to add the pixel signals from the light-receiving portions divided in the first pupil division direction in the second operation.

9. The focus detection method according to claim 7, wherein the controlling of the imaging unit includes controlling the imaging unit so as not to add the pixel signals output from the pixel portions regarding the first pupil division direction, and to add the pixel signals regarding the second pupil division direction in the first operation.

10. The focus detection method according to claim 7, wherein the controlling of the imaging unit includes controlling the imaging unit to add the pixel signals output from the pixel portions regarding both the first pupil division direction and the second pupil division direction in the second operation.

11. The focus detection method according to claim 7, wherein the controlling of the imaging unit includes controlling the imaging unit to read only a part of the pixel signals regarding the second pupil division direction in the first operation.

12. The focus detection method according to claim 10, wherein the controlling of the imaging unit includes controlling the imaging unit to read only a part of the pixel signals regarding the second pupil division direction when a frame rate relating to the first operation is faster than a predetermined value.

13. A computer readable non-transitory storage medium that stores a focus detection program using an imaging unit including one or more pixel portions in which a plurality of light-receiving portions are arranged, the light-receiving portions being divided into a first pupil division direction and a second pupil division direction that differs from the first pupil division direction, to perform photoelectric conversion on each light flux that passes through an exit pupil region having different imaging optical systems with respect to one microlens, and to generate pixel signals, the focus detection program comprising:
performing processing to display an image based on a display pixel signal for display that is generated based on the pixel signals;
performing processing for focus detection based on a focus detection pixel signal for focus detection that is generated based on the pixel signals; and
controlling the imaging unit to alternately perform a first operation and a second operation, each including generation and reading of the pixel signals, the controlling of the imaging unit includes controlling the imaging unit to generate the focus detection pixel signal regarding the first pupil division direction in the first operation, and controlling the imaging unit to generate the display pixel signal and the focus detection pixel signal regarding the second pupil division direction in the second operation.

14. The storage medium according to claim 13, wherein the controlling of the imaging unit includes controlling the imaging unit to add the pixel signals from the light-receiving portions divided in the second pupil division direction in the first operation, and to add the pixel signals from the light-receiving portions divided in the first pupil division direction in the second operation.

15. The storage medium according to claim 13, wherein the controlling of the imaging unit includes controlling the imaging unit not to add the pixel signals output from the pixel portions regarding the first pupil division direction, and to add the pixel signals regarding the second pupil division direction in the first operation.

16. The storage medium according to claim 13, wherein the controlling of the imaging unit includes controlling the imaging unit to add the pixel signals output from the pixel portions regarding both the first pupil division direction and the second pupil division direction in the second operation.

17. The storage medium according to claim 13, wherein the controlling of the imaging unit includes controlling the imaging unit to read only a part of the pixel signals regarding the second pupil division direction in the first operation.

18. The storage medium according to claim 17, wherein the controlling of the imaging unit includes controlling the imaging unit to read only a part of the pixel signals regarding the second pupil division direction when a frame rate relating to the first operation is faster than a predetermined value.

\* \* \* \* \*